S. E. CARLIN.
CALCULATING MACHINE.
APPLICATION FILED SEPT. 6, 1910.

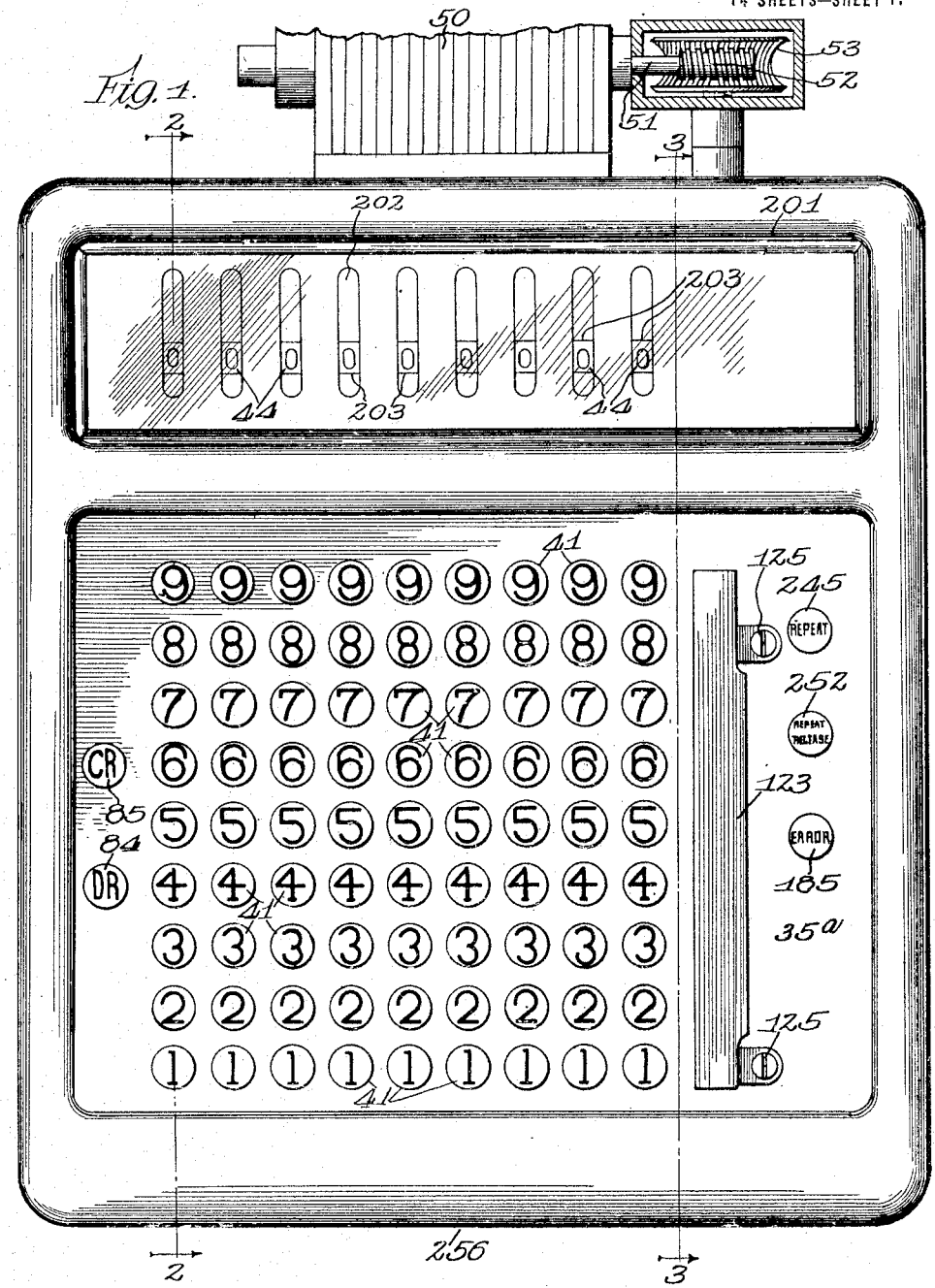

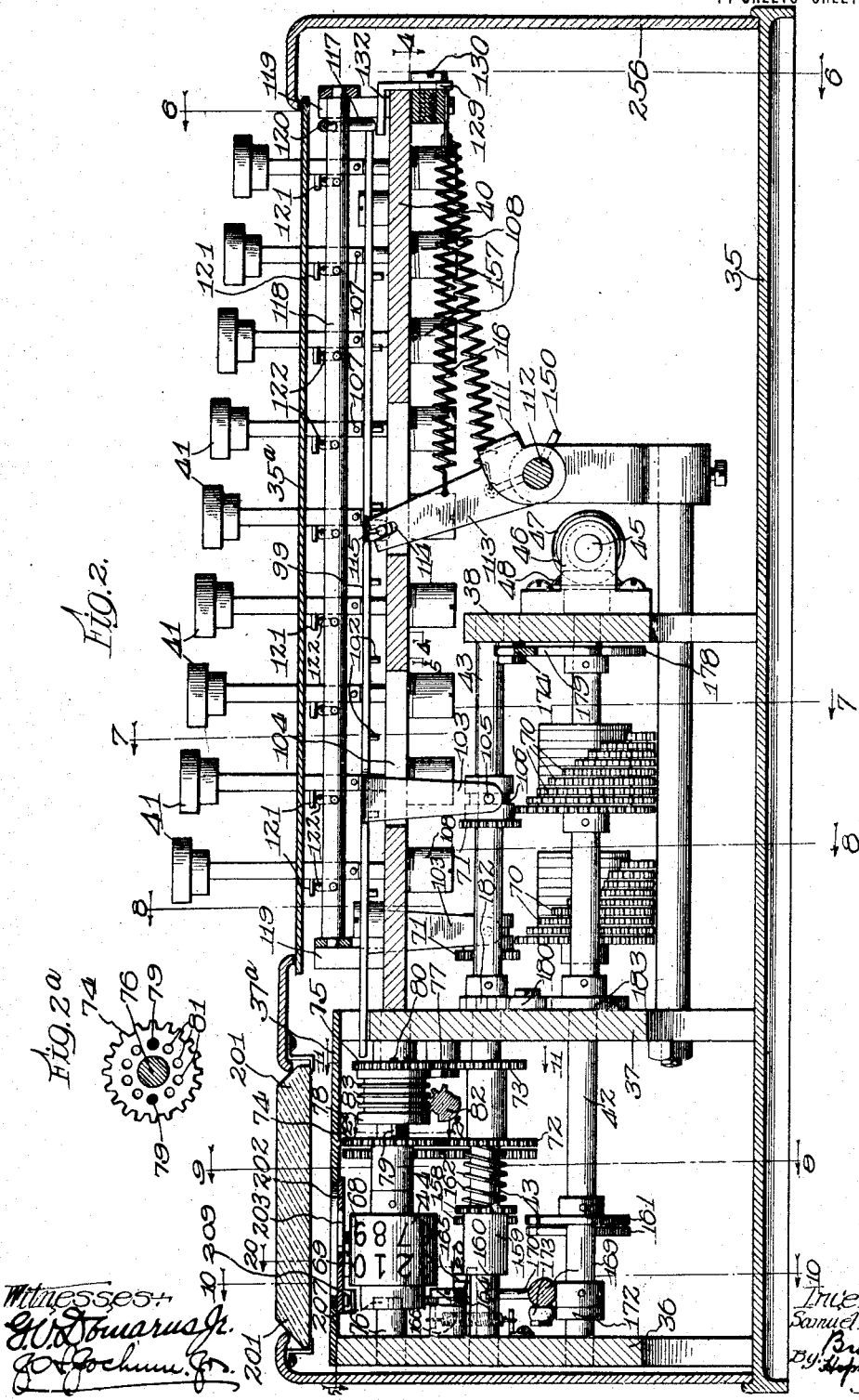

1,208,287.

Patented Dec. 12, 1916.
14 SHEETS—SHEET 3.

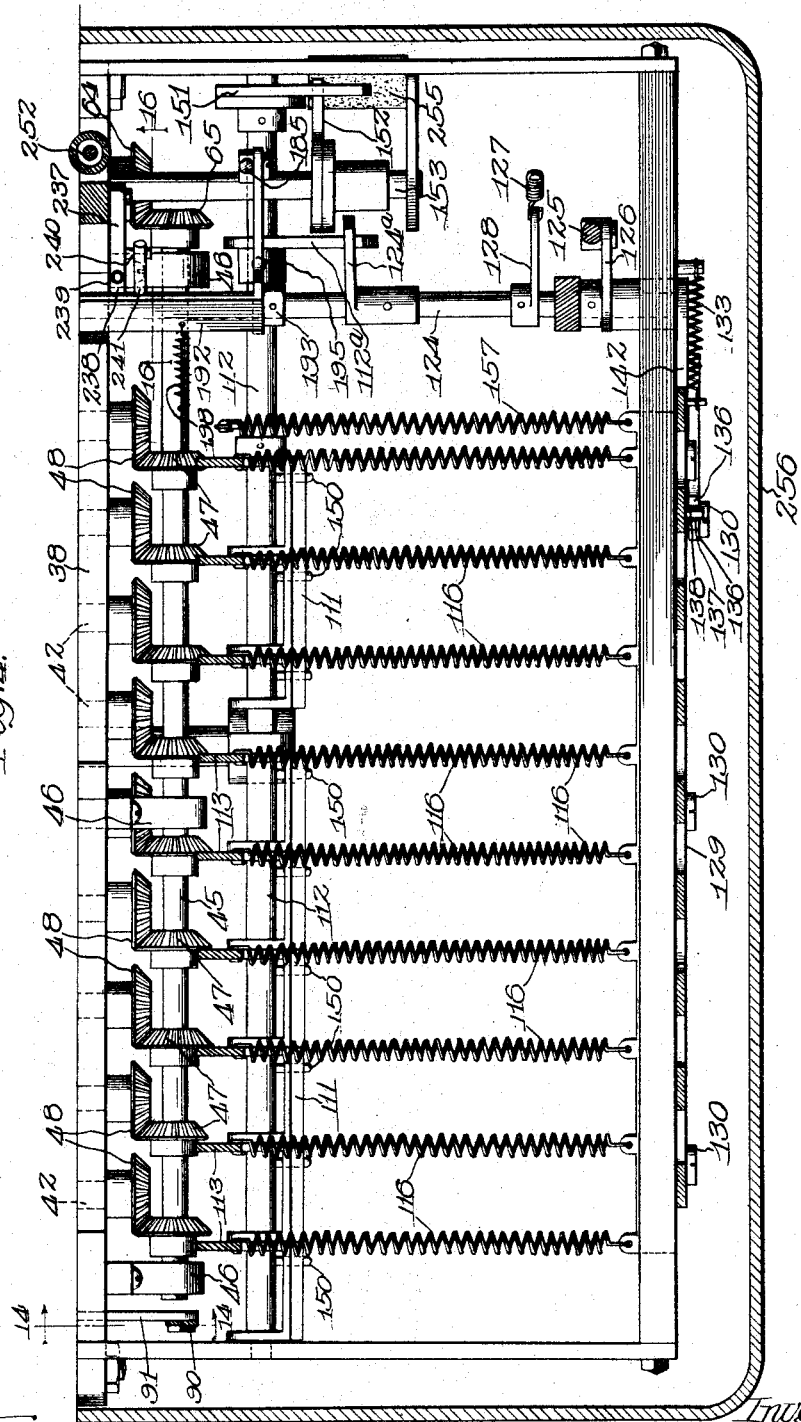

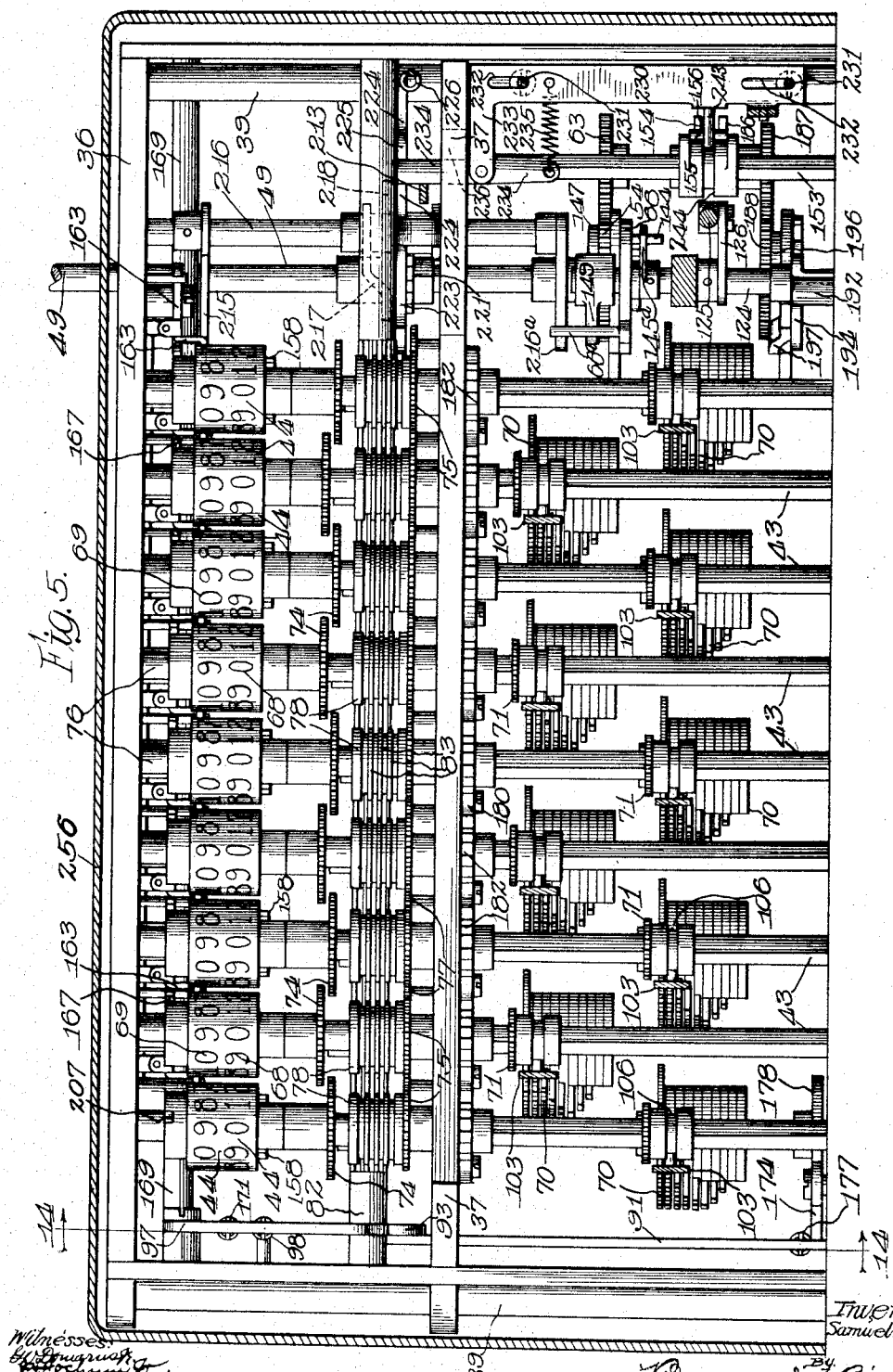

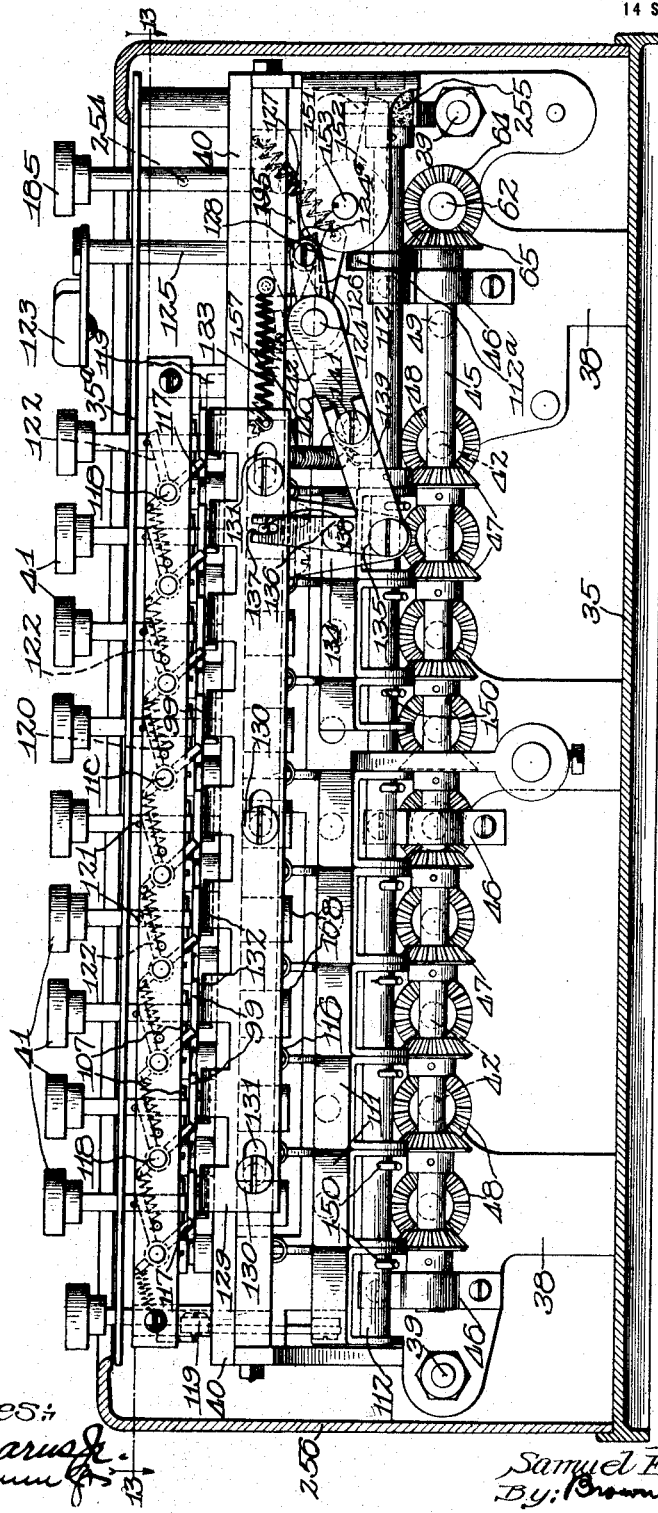

S. E. CARLIN.
CALCULATING MACHINE.
APPLICATION FILED SEPT. 6, 1910.
1,208,287.
Patented Dec. 12, 1916.
14 SHEETS—SHEET 7.
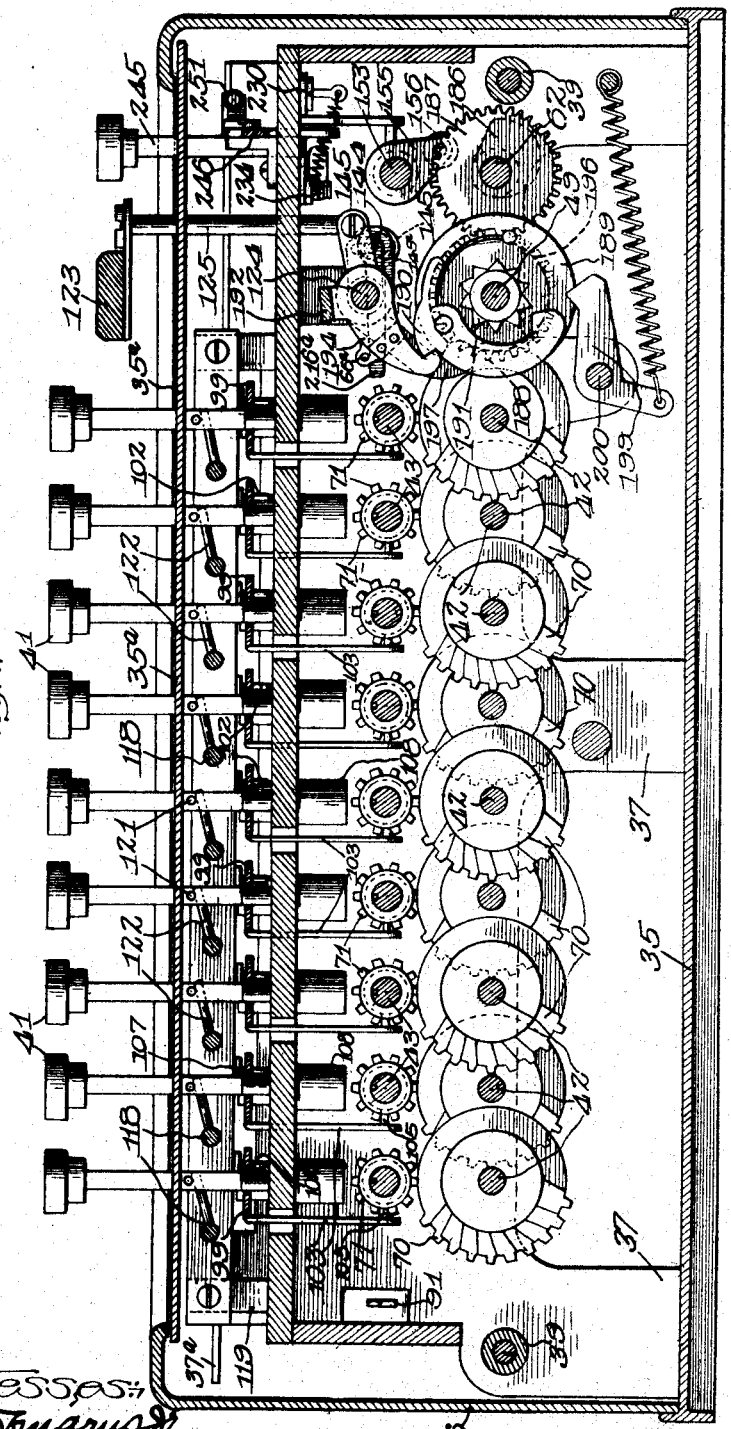

S. E. CARLIN.
CALCULATING MACHINE.
APPLICATION FILED SEPT. 6, 1910.
1,208,287.
Patented Dec. 12, 1916.
14 SHEETS—SHEET 8.
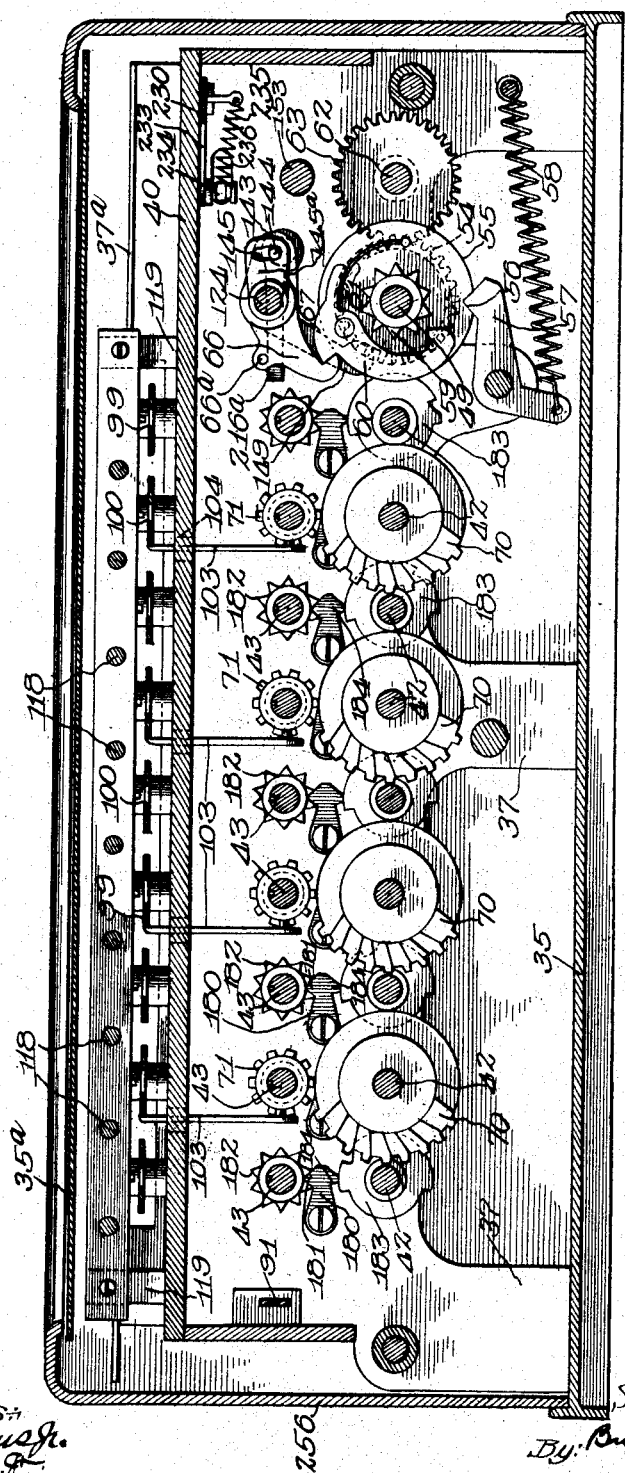

S. E. CARLIN.
CALCULATING MACHINE.
APPLICATION FILED SEPT. 6, 1910.
1,208,287.
Patented Dec. 12, 1916.
14 SHEETS—SHEET 9.
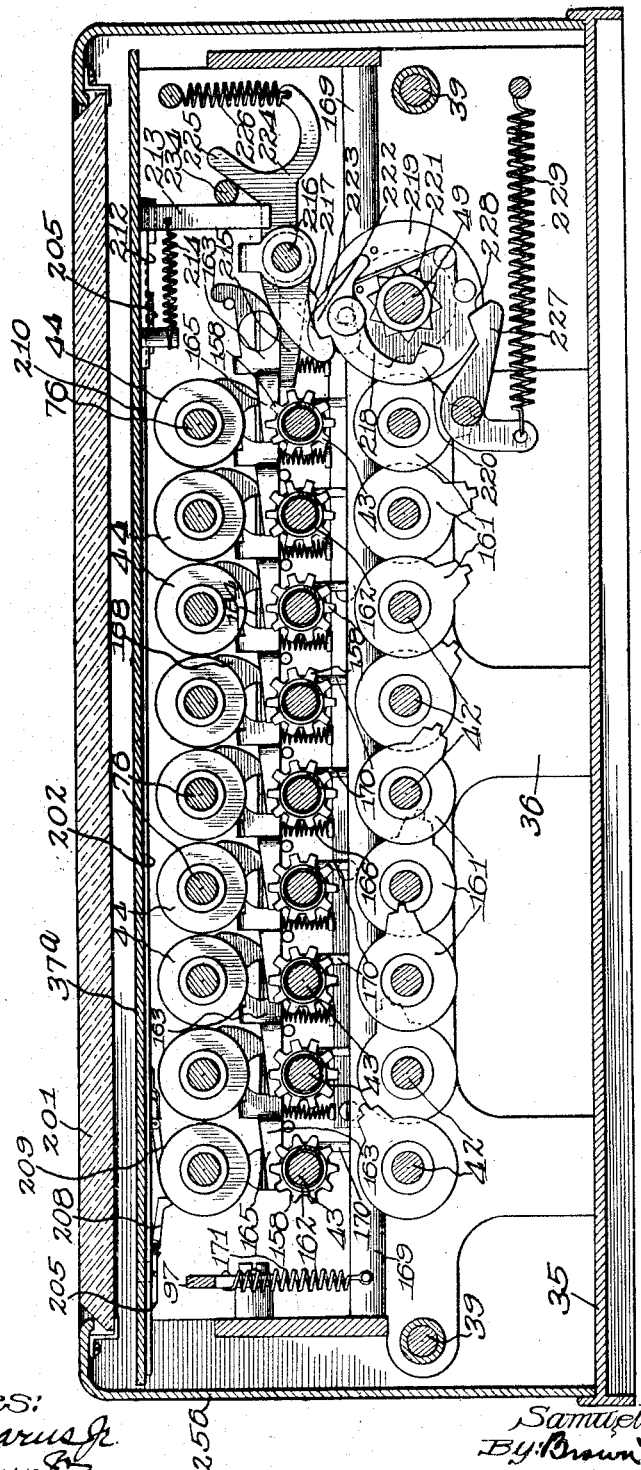

S. E. CARLIN.
CALCULATING MACHINE.
APPLICATION FILED SEPT. 6, 1910.
1,208,287.
Patented Dec. 12, 1916.
14 SHEETS—SHEET 10.
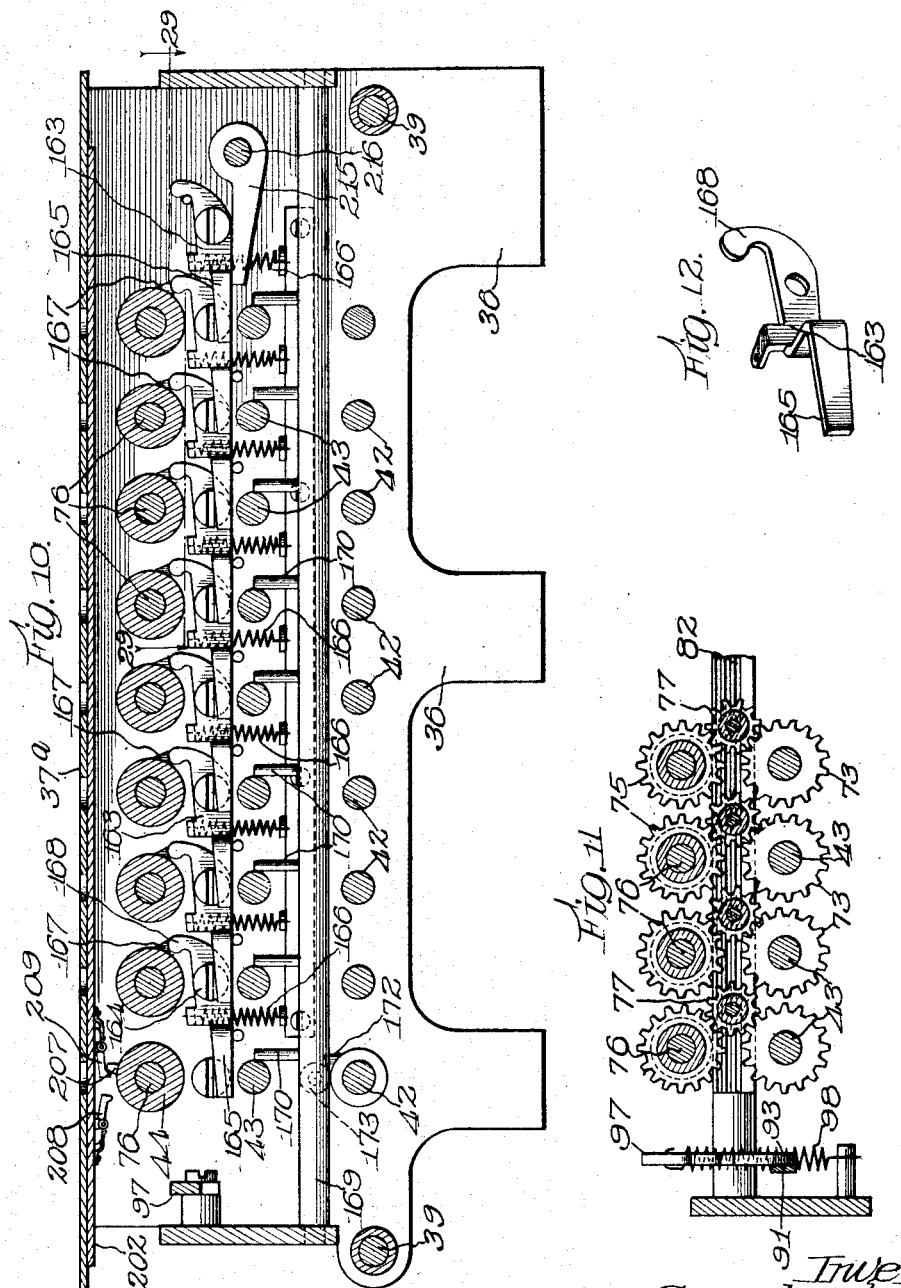

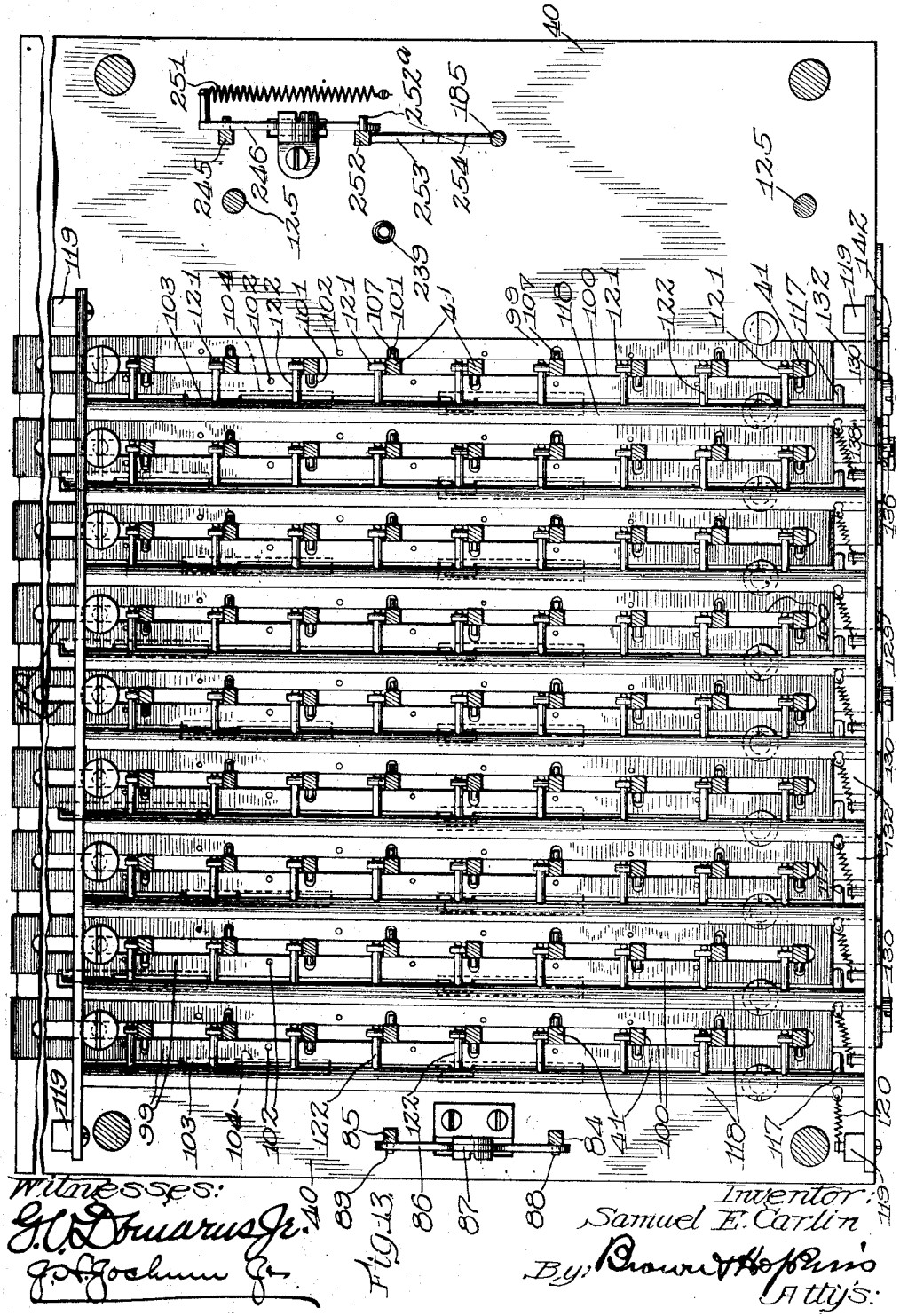

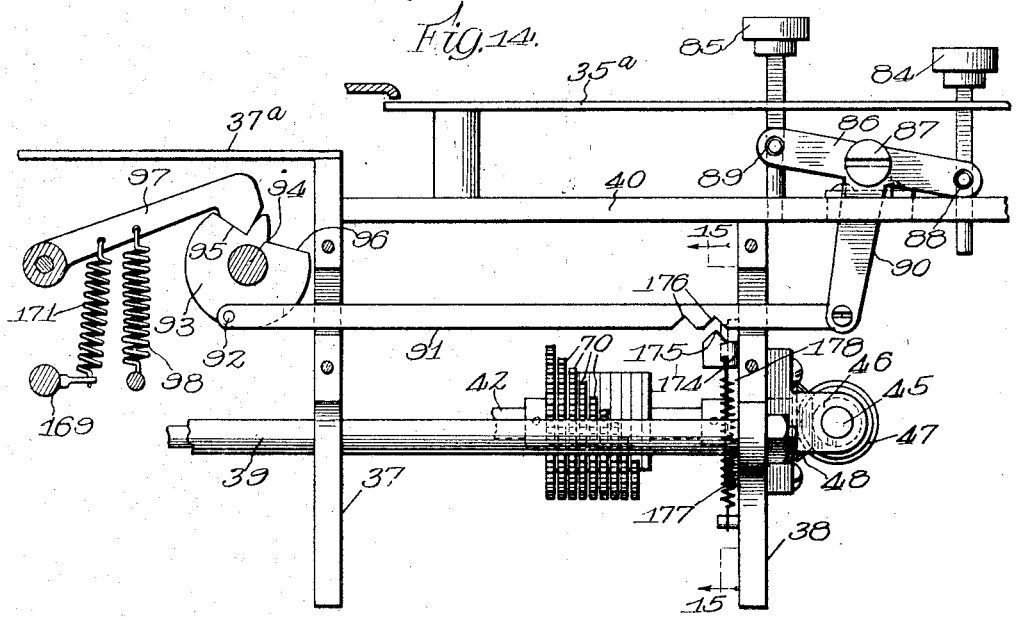
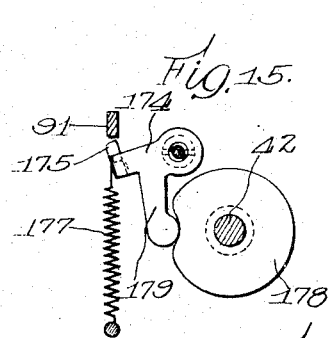
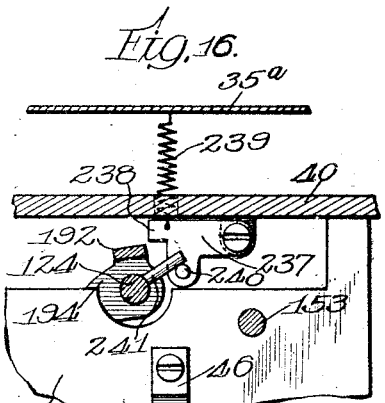
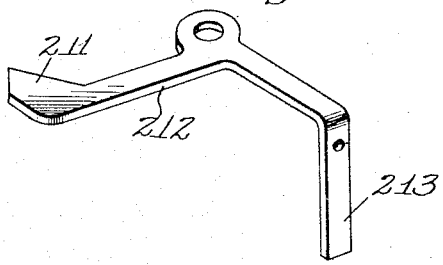
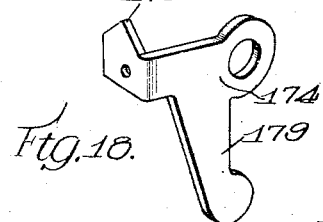

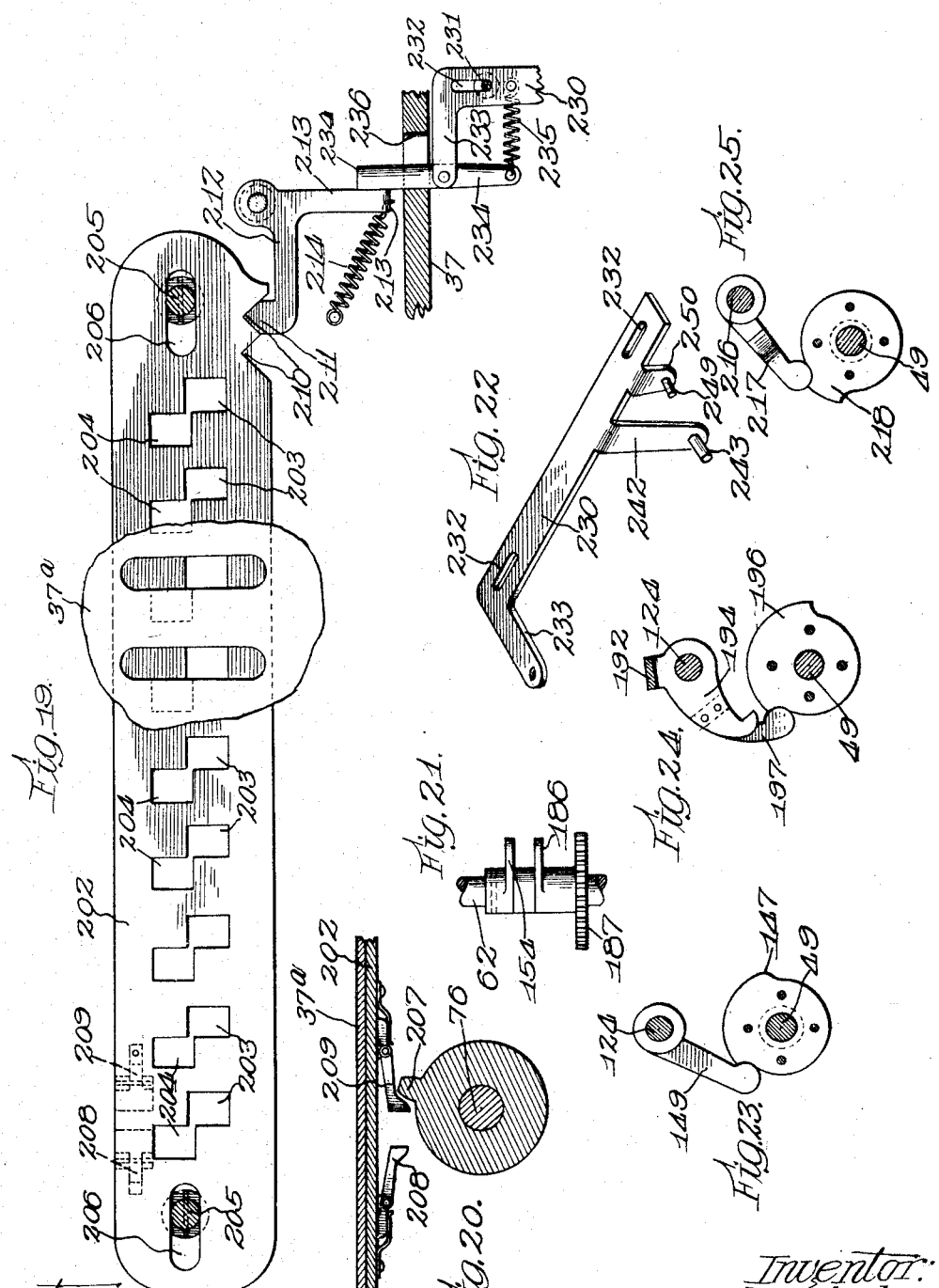

S. E. CARLIN.
CALCULATING MACHINE.
APPLICATION FILED SEPT. 6, 1910.
1,208,287.
Patented Dec. 12, 1916.
14 SHEETS—SHEET 14.
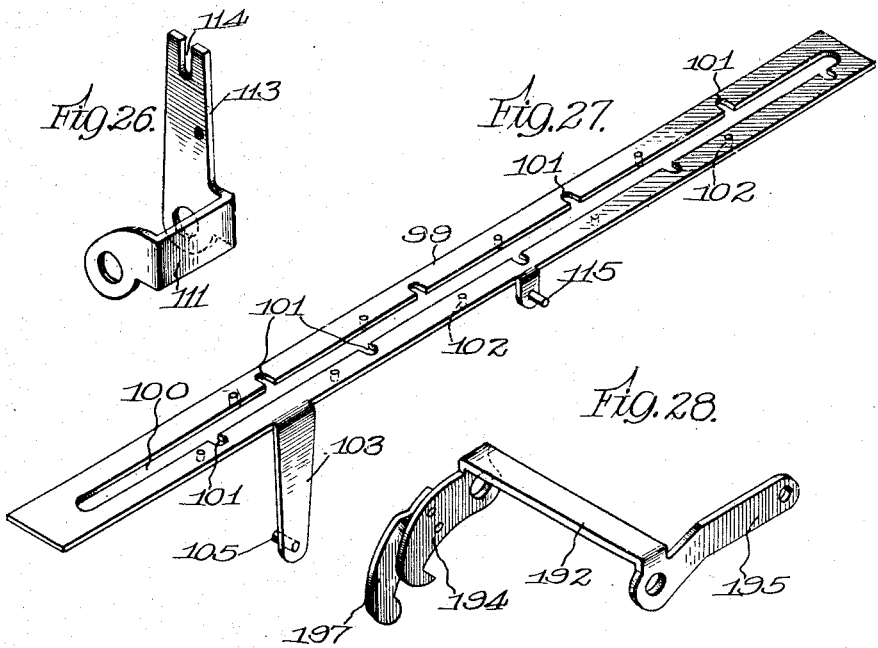
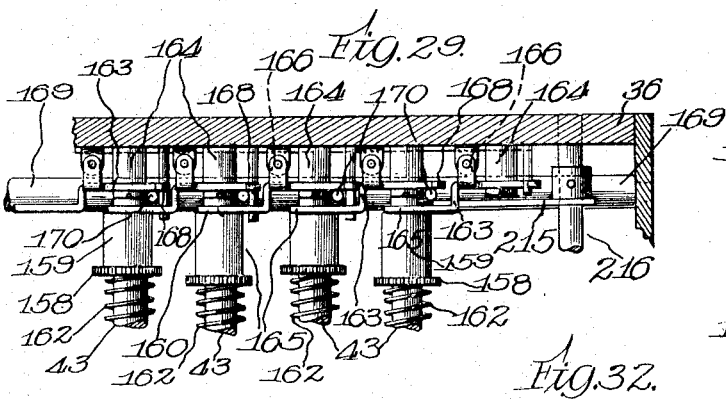
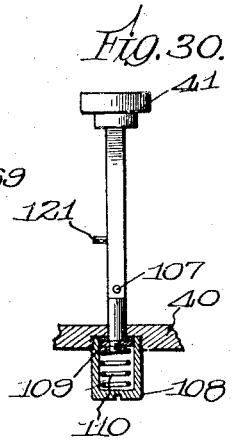
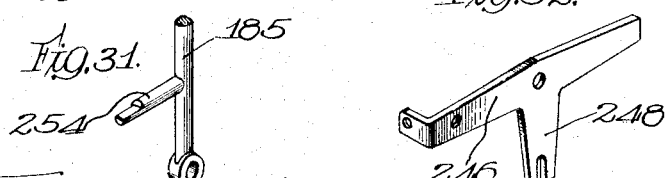
Witnesses:
Inventor:
Samuel E. Carlin
By Brown & Hopkins
Attys:

UNITED STATES PATENT OFFICE.

SAMUEL E. CARLIN, OF CHICAGO, ILLINOIS, ASSIGNOR TO CARLIN CALCULATOR COMPANY, OF CHICAGO, ILLINOIS, A CORPORATION OF ILLINOIS.

CALCULATING-MACHINE.

1,208,287.  Specification of Letters Patent.  Patented Dec. 12, 1916.

Application filed September 6, 1910. Serial No. 580,659.

*To all whom it may concern:*

Be it known that I, SAMUEL E. CARLIN, a citizen of the United States, residing at Chicago, in the county of Cook and State of Illinois, have invented certain new and useful Improvements in Calculating-Machines, of which the following is a specification.

This invention relates to calculating machines of the non-listing, single totalizer type, wherein the totalizer operates subtractively and addingly and is therefore algebraic in its operation, and consists in substantially the construction hereinafter to be described, illustrated in the drawings, and particularly pointed out in the claims.

It is also an object of this invention to improve and refine a machine of this character, with a view of simplifying the elements, increasing the efficiency, and decreasing the cost of manufacture.

With the above and other objects in view, as will be hereinafter apparent, this invention consists in the construction, combination, and arrangement of parts, all as hereinafter more fully described, claimed and illustrated in the accompanying drawings, wherein:

Figure 1 is a plan view, partly in section, of a machine constructed in accordance with the present invention. Fig. 2 is a longitudinal vertical section of the machine, taken along the line 2—2 of Fig. 1 and illustrates the totalizer, power and drive shafts, the selective slides for the determination of the varied movement imparted to the totalizer, and the locks for said selected slides. Fig. 2ᵃ is a vertical section taken along the line 2ᵃ—2ᵃ of Fig. 2 and shows, in elevation, one of the totalizer gears. Fig. 3 is a longitudinal section taken along the line 3—3 of Fig. 1 to illustrate the controls of the machine, such as the repeat and repeat release keys, the error key, the motor bar, and their associated clutches and elements. Fig. 4 is a horizontal section taken along the line 4—4 of Fig. 2, and illustrates the transmission gearing for imparting a rotary movement to the totalizer power shafts; also, the mechanism for returning the selective slides to their inactive positions, either automatically or by the error key. Fig. 5 is a plan view of the totalizer, the mechanism for controlling its direction of rotation, and the totalizer drive and power shafts, the same being a section taken along the line 5—5 of Fig. 2. Fig. 6 is a transverse vertical section taken along the line 6—6 of Fig. 2 to illustrate the locks of the selective slides and the mechanism for returning said slides to their inactive positions either automatically or by the error key. Fig. 7 is a similar vertical section taken along the line 7—7 of Fig. 2, and illustrates in detail the coöperation between the totalizer power and totalizer drive shafts, whereby a varied movement is imparted to the totalizer shafts, and also the error key clutch, and the repeat key. Fig. 8 is a similar view along the line 8—8 of Fig. 2 and illustrates the locks for the totalizer drive shafts, the coöperation of the gears mounted on said drive shafts and adjusted by the selective slides, with the mutilated gears of the totalizer power shafts, and the motor bar clutch. Fig. 9 is a vertical section taken along the line 9—9 of Fig. 2, to illustrate the carrying gears of the totalizer and the clutch for the correction of the units error which occurs in an algebraic totalizer. Fig. 10 is also a vertical section taken along the line 10—10 of Fig. 2 and illustrates the dogs for setting the carrying gears, means for operating said dogs, and the shaft for returning said carrying gears to their normal and inactive positions. Fig. 11 is a vertical section taken along the line 11—11 of Fig. 2 to illustrate a fragment of the totalizer shift whereby the direction of rotation of said totalizer is changed. Fig. 12 is a perspective view of one of the dogs for controlling and setting the carrying gears. Fig. 13 is a view illustrating the coöperation between the selective slides and the keys, and also the shafts for operating the selective slide locks, and the coöperation of said shafts with said keys, the same being a horizontal section taken along the line 13—13 of Fig. 6. Fig. 14 is a side elevation of the control for the totalizer shift illustrated in Fig. 11, and the lock for coöperating therewith, and is a section taken along the line 14—14 of Figs. 4 and 5. Fig. 15 is a vertical section taken along the line 15—15 of Fig. 14, and illustrates a lock for the control of the totalizer shift whereby the direction of rotation of the totalizer cannot be changed during the operation of the machine. Fig. 16 is a vertical transverse section taken along the line 16—16 of Fig. 4, showing the lock for the motor bar and the error key whereby one is locked against movement during the operation of the other, and vice versa. Fig. 17 is a perspective view of the bell crank lever or dog which retains the shutter of the totalizer in its adjusted position and operates the mechanism for the correction of the units error. Fig. 18 is a similar view of the lock for the control of the totalizer shift. Fig. 19 is a plan view of the shiftable shutter of the totalizer and the mechanism controlled by the movement thereof, for the correction of the units error. Fig. 20 is a vertical section taken along the line 20—20 of Fig. 2, and illustrates the means whereby the shutter is shifted by the passage of the number bearing member of the highest denominational order through zero in either direction. Fig. 21 is a plan view of the cams through the medium of which the selective slides are returned to their normally inactive positions automatically at the end of the calculation, or by the operation of the error key, in which event no calculation occurs. Fig. 22 is a perspective view of the slide coöperating with the repeat and repeat release keys whereby the mechanism for the correction of a units error is made inactive during repeated addition or subtraction, and the mechanism for returning the selective slides to their normal or inactive positions is also rendered inoperative. Fig. 23 is an elevation partly in section of the dog and cam coöperating with the power shaft of the machine whereby the rock shaft operated by the motor bar is locked from movement during calculation. Fig. 24 is a similar view illustrating a lock for rendering the error key ineffective. Fig. 25 is an elevation of the cam and arm whereby the carrying gear of the units order is released for the correction of the units. Fig. 26 is a perspective view of one of the yokes coöperating with each selective slide whereby the same are returned to their normal and inactive positions. Fig. 27 is a perspective view of one of said selective slides. Fig. 28 is a perspective view of said yoke controlled by the error key. Fig. 29 is a horizontal section taken along the line 29—29 in Fig. 10, and illustrates the arrangement of the carrying gears of the totalizer and the controlling dogs coöperating therewith. Fig. 30 is an elevation partly in section of one of the denominational keys. Fig. 31 is a detailed perspective view of the stem of the error key. Fig. 32 is a perspective view of the bell crank operated by the repeat and repeat release keys.

Referring more particularly to the drawings and in the present exemplification of the invention, the numeral 35 designates a base upon which is mounted spaced upright supports 36, 37 and 38, which latter may be connected or fastened together in any desired or suitable manner, preferably by means of tie rods or bolts 39 (shown more clearly in Figs. 4 and 5), and these supports form bearings for the various shafts. A support 40 is provided, which is arranged preferably adjacent the front of the machine, as shown in Figs. 2 and 3, and this support serves as a means for supporting the keys 41, which will be hereinafter described.

Journaled in the supports 36, 37 and 38 are a plurality of power shafts 42 (see Figs. 2 and 5), preferably nine in number, and one for each of the operating shafts 43. These latter shafts are also journaled in suitable bearings, preferably in the supports 36, 37 and 38, and are arranged in a plane above the shafts 42. One of these power and operating shafts 42, 43, is provided for each of the number bearing members 44 of the totalizers. Motion may be imparted to the shafts 42 in any desired or suitable manner but preferably by means of a shaft 45 journaled in suitable bearings 46, so as to extend transversely across one end of the shafts 42, and this shaft 45 is provided with a plurality of bevel gears 47, which respectively mesh with similar gears 48 on the adjacent ends of the shafts 42, and through the medium of which meshing gears, the shafts 42 will be rotated, preferably in a manner which will now be described.

A shaft 49, which for the sake of convenience, will hereinafter be designated as a running shaft, is provided for imparting motion to the shaft 45, and this running shaft 49 derives its motion from a motor 50 (see Figs. 1, 4 and 5) on the axle 51 of which motor is provided a worm gear 52. The shaft 49 is journaled in suitable bearings, preferably in the supports 36, 37 and 38, so as to extend longitudinally of the machine transversely with respect to the shaft 45 and parallel with the shafts 42. On the end of the running shaft is provided a gear 53 with which the worm gear 52 meshes, and a gear 54 (see Figs. 5, 7 and 8), which latter is mounted loosely on the shaft. Secured to and for rotation with the gear 54 and also loosely mounted on the shaft 49 is a disk 55 which is provided with a notch 56 in its periphery, into which notch a portion of a dog 57 projects to lock the gear 54 and the disk 55 against overthrow. An elastic member 58 in the form of a spring is provided which tends normally to project the portion of the dog 57 into the notch 56. Secured to and for rotation with the shaft 49 and adjacent the disk 55 is a star toothed wheel 59 and a dog 60 is pivotally supported by the disk 55 for locking the disk 55 and the gear 54 to the shaft 49 for rotation therewith. An elastic member 61 controls the dog 60 and tends normally to move the latter in a direction to lock the disk and wheel to the shaft. The gear 54 is provided for the purpose of communicating motion from the shaft 49 to the shafts 42, and this is accomplished through the medium of a shaft 62 (see Figs. 4, 5, 6, 7 and 8), on which shaft 62 is keyed a gear 63. This gear 63 meshes with the gear 54 so that when the shaft 49 is rotated and the gear 54 locked thereto, the shaft 62 will be rotated by the gear 63, and this motion of the shaft 63 will be imparted to the shaft 45 through the medium of meshing gears 64, 65, secured respectively to the shafts 62, 45 (as shown more clearly in Figs. 4 and 6). It will thus be seen that when the dog 60 locks the gear 54 to the shaft 49, the motion of the shaft 49 will be imparted to the shafts 42.

In order to permit the shafts 42 to make one complete revolution and then stop, mechanism must be provided for unlocking the gear 54 from the shaft 49 at the proper time. Any suitable means may be provided for this purpose but a simple and efficient means for accomplishing this result comprises a dog 66 which is adapted to engage a shoulder 67 on the dog 60 to move the latter out of engagement with the star or toothed wheel 59 and against the tension of the elastic member 60. This dog 66 is adapted to be operated to release the dog 60 to lock the gear 54 to the shaft 49 in a manner which will be hereinafter described.

The number bearing members or wheels 44 of the totalizer are each provided in the present exemplification with two series of numbers 68, 69, which progress from zero to 9, and the numbers of the two series are so arranged with respect to each other that they will progress successively in opposite directions and so that the sum of the respective adjacent numbers of the series when added together will make nine. One of these series of numbers may be differentiated from the other series in any suitable manner, such as by means of different colors. These number bearing members are adapted to be controlled by the keys 41, of which there are provided nine keys for each number bearing member, and the keys are adapted to control the mechanism whereby a variable movement may be imparted to each of the respective number bearing members according to which of the keys is actuated. In order to accomplish this variable movement of the number bearing members, there is provided a plurality of mutilated gears 70 on each of the shafts 42. These gears are preferably nine in number and are secured together in any desired or suitable manner, the series of gears on the shafts 42 being preferably arranged in staggered relation to each other and each series is provided respectively with a different number of teeth from 1 to 9 and arranged so that the number of teeth will progress successively from one end to the other end of the respective series. A traveling gear 71 is mounted upon each of the shafts 43 and secured for rotation with respect to shafts 43 and for adjustment longitudinally on the shafts in any ordinary and well known manner, each of the gears 71 being arranged upon the shafts in the same relative position as the gears 70 on the shafts 42. These gears 71 are adapted to be moved for any desired distance on the respective shafts 43 so as to be positioned with respect to the gears 70 to engage the latter when the shafts 42 are rotated, and thereby impart a degree of rotation to the shafts 43 corresponding to the number of teeth on the respective gears 70 with which the traveling operating gears 71 mesh. This variable motion of the shaft 43 is imparted to the number bearing members 44 of the totalizer through the medium of connecting gears, comprising spaced gears 72, 73, secured to the shafts 43, and corresponding to gears 74, 75, mounted loosely upon shafts 76 to which the number bearing members 44 of the totalizer are secured. One of these gears 72, 73, is adapted to rotate the shafts 76 and consequently the respective number bearing member 44 in one direction, while the other of the gears 72, 73, is adapted to rotate the shafts 76 and the number bearing member 44 in the opposite direction. In order to accomplish these different directions of rotation, one of the gears, preferably the gear 72, meshes directly with the gear 74, while the gear 73 imparts its motion to the gear 75, through the medium of an intermediate gear 77 (see Figs. 2 and 5).

In order to lock the gears 74, 75, to the shaft 76, a sleeve or collar 78 is provided, which is secured to the shaft 76 for rotation therewith and for longitudinal adjustment thereon. Each of the collars 78 is of a length slightly less than the length of the space between the gears 74, 75, and is provided with projections 79, 80, extending from the extremities thereof, which projections are adapted to enter apertures 81, provided in the gears 74, 75, and the projections are of such a length that when the collars 78 are shifted to lock one of the gears 74, 75, for rotation with the shaft 76, the projections on the other end of the sleeve or collar will move out of the apertures in the other of the gears 74, 75 to release the latter. The direction of rotation of the number bearing members 44 is, therefore, controlled by the sleeve or collar 78, and this sleeve or collar may be shifted longitudinally on the shaft 76 in any suitable manner, preferably by means of a pivotally supported toothed member 82 (shown more clearly in Figs. 2, 5 and 11), the teeth of which member mesh with circumferential flanges 83 on the collar 78. It will therefore be seen when the member 82 is rocked, the collar will be correspondingly shifted.

Suitable mechanism is provided for shifting the machine so as to perform addition or subtraction or to cause the machine to indicate debits and credits, and preferably compresses two keys 84, 85 (shown more clearly in Figs. 1, 5, 6, 13 and 14), which are designated respectively as debit and credit keys. These keys are arranged in a convenient position for the operator and are connected in such a manner that when one of them is actuated or depressed the other will be released or returned. In order to accomplish this, an oscillating member 86, is provided which is pivotally supported as at 87. To one extremity of the member 86 is pivotally connected as at 88 the stem of the key 84, while the stem of the key 85 is pivotally connected as at 89, to the other extremity of the member and on the opposite side of the pivot 87. This member 86 is provided with an arm 90 to the free extremity of which is pivotally connected the slide bar or member 91. The other extremity of this bar or member 91 is connected as at 92 to a disk or crank 93, secured to the axle 94 of the toothed member or segment 82 (see particularly Figs. 5 and 14). Thus it will be seen that when the member 86 is rocked in one direction by one of the keys 84, 85, the other key will be elevated, while at the same time the bar or slide 91 will rock the toothed member or segment 82 in one direction or the other through the medium of the crank or disk 93. In order to retain the toothed member or segment 82 and consequently the sleeves or collars 78 in their adjusted positions, the crank or disk 93 is provided with spaced notches 95, 96, and a dog 97, controlled by elastic members or springs 98, is provided, which is adapted to enter the notches 95, 96 respectively, after the toothed member or segment has been adjusted. The tension of the elastic members 98 is such that the dog will be held against accidental displacement, but will yield when pressure is exerted upon the cam or disk 93 by the actuation of either of the keys 84, 85.

As has been before stated, the degree of rotation of the number bearing members 44 is controlled by the actuation of the keys 41, which latter are adapted to control this rotation by the degree of adjustment of the gears 71 with respect to the gears 70. The selecting mechanism whereby this adjustment of the gears 71 is accomplished will now be described.

A selecting member or slide 99 (see particularly Figs. 2, 7, 13, 27) is provided, one for each of the gears. As the construction and operation of each of the selecting mechanisms are the same, the description of one will apply to them all. The selecting member or slide 99 is provided with an elongated slot 100, extending longitudinally thereof, and for substantially the entire length thereof. Recesses 101 are provided in the member which open through the edges of the slot 100 to communication with the slot, and are arranged on each side of the slot in staggered relation with respect to each other. A plurality of depending pins or projections 102 are provided on the member 99 which project below the lower face thereof and in advance of each of the recesses 101, and serve as means for arresting the movement of the member 99 in a manner which will be presently set forth.

A depending arm or projection 103 is provided on the member 99, which extends through a slot 104 in the support 40 and is connected with the respective gear 71 on the shaft 43 by means of a lateral projection 105, extending into a circumferential groove 106 in the hub of the gear 71. Each of the keys 41 (see particularly Figs. 2, 13 and 30) is provided with a lateral projection 107 on the stem thereof and these stems project through the slot 100 and also through the support 40. A casing or housing 108 is removably supported by the support 40, beneath each of the keys 41 in such a manner that a head 109 on the stem will enter the housing, and an elastic member 110 is provided within the housing which tends normally to elevate the keys 41. The slide 99 is adapted to be held normally in a position so that one recess 101 will stand beneath each of the pins or projections 107 on each of the series of keys 41, so that when any one of the keys of the series is depressed, the pin or projection 107 will pass through the respective recesses 101 and beneath the number or slide 99 to a position within the path of movement of one of the depending pins or projections 102. In order to move the slide or member 99 to this position, there is provided a member 111 (see Figs. 2 and 26) which is pivotally supported in any suitable manner, preferably on a rock shaft 112, journaled in suitable supports (see particularly Figs. 2 and 4). This member 111 is preferably in the form of a yoke, as shown, and is provided with an arm or extension 113, having a bifurcated extremity 114, and is of such a length that a laterally projecting pin or lug 115 (see Figs. 2 and 27) on the slide 99 will enter the bifurcation. It will therefore be seen that when the member 111 is rocked about its point of pivotal support, the slide 99 will be correspondingly moved.

The slide 99 is normally held in a position to cause the gear 71 to be moved out of mesh with the gear 70, and in order that the selecting mechanism may quickly adjust the gear 71 into the proper position with relation to the gears 70, an elastic member 116 is provided which tends normally to move the slide 99 to shift the gear 71 and to cause one of the pins or projections 102 thereon to engage with a pin or projection 107 on the actuated key 41. This elastic member 116 is secured by one extremity preferably to the arm 113 of the member 111 and is anchored by its other extremity to a fixed support. When the slide 99 is adjusted to a position that the recesses 101 will stand beneath the pins or projections 107, a tension is created upon the elastic member 116 and the slide may be locked in this position by means of an arm 117 (see particularly Figs. 2 and 13) which is secured to a rock shaft 118, journaled in suitable bearings 119, adjacent and above the slide 99, so as to extend longitudinally thereof and transversely with respect to the stems of the keys 41. An elastic member 120 is provided which tends normally to rock the shaft 118 in a direction to project the arm 117 in the path of movement of one extremity of the slide 99 when the latter is acted upon by the tension of the elastic member 116. In order, therefore, to release the slide 119 to permit the elastic member 116 to adjust the slide and position the gear 71 with respect to the gear 70 by the actuation of the keys 41, it is necessary to first rock the shaft 118 to move the arm 117 and thereby release the slide. This movement of the shaft 118 may be accomplished by means of another lateral projection or pin 121 (see also Fig. 30) on the stems of the keys 41, each of which projections 121 is adapted to engage an arm or projection 122 on the shaft 118 and the arms or projections 122, and pins or projections 121 are so arranged with respect to the pins or projections 107 of the key stems that the shaft 118 will be rocked just about the time the pins or projections 107 reach the limit of their movement through the recesses 101 in the slide 99. When the arm 117 is moved to release the slide 99, the elastic member 116 will exert its tension on the member 111 through the medium of the arm 113 to automatically and quickly adjust the slide 99 until the depending pin or projection 102, just in advance of the pin or projection 107 on the stem of the key 41, which has been actuated, will engage such pin or projection 107 to arrest the movement of the slide, at which time the gear 71 will be properly positioned with respect to the gears 70 to impart a number of steps of rotation to the number bearing members 44 through the medium of the intermediate connections already described, corresponding to the number indicated by the actuated key. After the desired number of gears 71 have thus been set, it will be apparent that when the connection already described between the running shaft 49 and the shaft 62 has been established, motion will be imparted to all of the various shafts and the respective number bearing members 44 will be correspondingly rotated. In order to establish this connection a controller key 123 is provided (see particularly Figs. 1, 3, 6 and 7), which is arranged in a convenient position for the operator. This controller key 123 is adapted to impart motion to a rock shaft 124 (see also Figs. 4 and 5), journaled in suitable supports and is connected to the rock shaft by means of suitable stems 125, which latter are connected to arms 126 on the rock shaft. In order that the controller key 123 may be conveniently arranged for the operator when actuating any of the keys of any of the series, it is arranged to extend substantially the entire length of the series, as shown more clearly in Fig. 1. The rock shaft 124 forms a support for the dog 66, which latter controls the clutch or coupling mechanism between the gear 54 and the shaft 49, and an elastic member 127 is provided, one extremity of which is connected to an arm 128 on the shaft 124 and the other extremity is anchored to a fixed support (see Figs. 4 and 6), and tends normally to rock the shaft 124 in a direction to cause the extremity of the dog 66 to move into the path of movement of the shoulder 67 on the dog 60 to move the latter about its point of pivotal support, and thereby release the gear 54 and the disk 55 with respect to the shaft 49. After the selecting mechanisms have been set in the manner already described, the controller key 123 may be actuated to shift the dog 66 and release the dog 60 so that motion will be imparted to the number bearing members 44.

In order to prevent injury to the machine which might be caused by the actuation of one of the keys 41, after the controller 123 has been actuated to set the mechanism in motion and before the completion of a complete cycle of movement of the parts it is desirable to lock all of the keys 41 which have not been actuated against actuation, it being, of course, understood that the actuated keys and all of the keys of the respective series in which one of the actuated keys is arranged are locked against actuation by the shifting of the respective slides or members 99. This locking mechanism, which will now be described, is designed for the purpose of locking the keys of the series which have not been used and to prevent actuation of the keys of these series which actuation would tend to adjust the respective gears 70 and thereby cause considerable damage such as by the stripping of the teeth of the gears.

A member 129 (see particularly Figs. 2, 6 and 13) is mounted for a sliding movement upon a suitable support, preferably the support 40 adjacent and across the front edge thereof and is held in position preferably by means of fastening devices 130, such as bolts, screws or the like, which pass through slots 131 in the member and into the support. This member 129 is of a length to extend transversely across the front ends of the shafts 118, and is provided with a plurality of spaced laterally projecting portions 132. One of these laterally projecting portions is provided for each of the shafts 118. These projecting portions 132 are of a length to extend beneath the free extremities of the arms or projections 117 on the shafts, and an elastic member 133 (shown more clearly in Fig. 6) is provided, one end of which is secured to the member 129 and the other end is anchored to a suitable fixed support and tends normally to adjust the member 129 so as to move the laterally projecting portions 132 from beneath the respective arms or projections 117. When the member 129 is in this position, as shown more clearly in Figs. 6 and 13, the arms or projections 117 will be free from the laterally projecting portions 132, and any of the keys 41 may then be actuated to rock the respective shafts 118 as the arms or projections 117 on the actuated shafts 118 will project into the space between adjacent laterally projecting portions 132.

In order, therefore, to lock against actuation the keys 41 which have not been actuated by the actuation of the space bar or key 123, a suitable connection should be provided between the member 129 and the controller or key, and such a connection will now be described.

Pivotally mounted upon a suitable support, preferably a depending arm or projection 134 on the support 40, is a bell crank lever, designated generally by the numeral 135 in Fig. 6. One arm 136 of this bell crank lever is provided with a bifurcated extremity 137 into which a laterally projecting lug or pin 138 on the member 129 projects. The other arm 139 of the bell crank lever is also provided with a bifurcated extremity 140 to receive a pin or projection 141 on an arm or crank 142, which latter is secured to the rock shaft 124, so that when the shaft 124 is rocked by the actuation of the controller or key 123 in the manner already described, the arm 142 will rock the bell crank lever 135 to shift the member 129 against the tension of the elastic member 133 to move the laterally projecting portions 132 beneath the arms or projections 117 on the shafts 118, which latter have not been actuated, and thereby lock those shafts, and consequently the keys 41 against actuation. When the controller key 123 is returned to its normal position, the shaft 124 will be rocked in the opposite direction by the elastic member 127 (see Figs. 4 and 6), and at the same time the elastic member 133 will shift the member 129 into a position so as to cause the spaces between the laterally projecting portions 132 to move into positions to receive the arms or projections 117 on the shaft 118.

This locking of the keys 41 should be accomplished before the clutch or coupling mechanism between the running shaft 49 and the shaft 62 is rendered active, and in order to accomplish this, mechanism should be provided whereby the member 129 will be adjusted to its locking position, slightly in advance of the releasing or rendering active of the clutch or coupling mechanism just referred to. As both of these parts are actuated by the same rock shaft 124 and the controller or key 123, suitable mechanism for accomplishing this result comprises a loose connection between the rock shaft and the dog 66, and will now be described, reference being had particularly to Figs. 3, 5, 7 and 8.

The dog 66 is mounted loosely upon the shaft 124 and is provided with an arm 143 projecting from which is a laterally extending pin or lug 144, which projects into an elongated slot 145 in an arm or extension 145$^a$ extending from the shaft 124 loosely therein. This slot 145 is so disposed with respect to the pin or projection 144 that when the dog 60 is in operating position to lock the gear 50 to the shaft 49, one end thereof will be spaced from the pin or projection 144, so that during the first portion of the movement of the rock shaft 124, under the influence of the operation of the controller or key 123, the rock shaft will operate through the intermediate connections the member 129 to shift the latter to a locking position. About the time this member 129 has assumed this locking position and during the remaining portion of the operation of the rock shaft by the controller or key 123, the end of the slot 145 in the arm 145$^a$ will be moved into engagement with the pin or projection 144 on the dog 66 to rock the latter and thereby release the dog 60. In order to hold the locking member 129 in an actuating or locking position during the time of calculation and before carrying, a locking mechanism is provided, preferably in the form of a cam 147, on the shaft 49 (see particularly Figs. 3, 8 and 23), which coöperate respectively with an arm 149 secured to the rock shaft 124, and this cam and arm are so arranged with relation to each other that when the controller or key 123 is actuated and the locking member 129 shifted, the high portions of the cam will coöperate with the extremities of the arm to lock the member against return during calculation, but allows it to return as soon as the carrying commences. After the completion of a calculation, it is necessary to restore the actuated keys 41 and the gears 71 to their normal or inoperative positions, so that another amount may be registered on the number bearing members 44, and suitable mechanism for thus restoring the parts will now be described, reference being had particularly to Figs. 2, 3, 4, 6, 7 and 21.

The members 111 being loosely mounted upon the shaft 112 will be shifted about the shaft by the influence of the elastic member 116 when the slide or member 99 is released, as has already been explained. Coöperating with these members 111 and projecting from the shaft 112 are a plurality of pins or projections 150, one for each of the members 111, and are spaced from the members 111 so as to permit the latter to move freely under the influence of the respective elastic members. Assuming the parts to be in the position shown in Fig. 2, it will be apparent that when the slide or member 99 is released, the elastic member 116 will rock the member 111 about the shaft 112 to move the body portion of the yoke shaped member 111 toward the pin or projection 150. The degree of movement of this member toward the pin or projection 150 and the point at which it will be arrested with respect to the pin or projection 150 will be determined by the keys 41 and the extent to which the gear 71 is adjusted with respect to the gear 70. When the parts are in this adjusted position, it will be apparent that if the members 111 should be rocked about the shaft 112 or in the direction contrary to the direction in which it had been moved by the elastic member 116, the parts controlled by the slide 99 will be moved to their normal positions and a tension will be created upon the elastic member 116. Therefore, in order to rock the shaft 112 and the pins or projections 150 to cause the latter to engage the respective members 111 and shift them to their normal positions, there is provided in the present exemplification of the invention an arm or crank 151 on the shaft 112, which arm is preferably located adjacent one end of the shaft, as shown in Figs. 3, 4 and 6, which is adapted to be engaged by an arm 152 on a shaft 153. This shaft 153 is journaled in suitable bearings mounted on suitable supports, and is preferably arranged to extend transversely with respect to the shaft 112, so that the arm 152 will project under the arm 151. Motion is imparted to the shaft 153 so as to raise the arm 152 by means of a cam 154, secured to and for rotation with the shaft 62 and above which shaft 62 the shaft 153 is located. An arm or crank 155 is secured to and depends from the shaft 153 in a position to be engaged by the cam 154 and rocked thereby to impart a rocking movement to the shaft 153. If desired an anti-friction roller 156 may be provided on the arm 155, with which the cam 154 engages to reduce the friction (see more particularly Fig. 3). The cam 154 is so located on the shaft 62 with respect to the arm 155 that just at the completion of the cycle of movement of the running shaft 49, after the calculation has been completed, its high portion will contact with the arm 155 to rock the shaft, and consequently the shaft 112, through the medium of the arms 150, 151, to cause the projections 150 on the shaft 112 to move into engagement with the respective members 111, and a continued movement of the shaft 112 in the same direction will cause the members or slides 99 to be shifted in a direction to move the gears 71 to their normal positions, and will thereby release all of the actuated mechanisms.

When the high portion of the cam 154 passes out of engagement with the arm 155, the shaft 153 and the shaft 112 will be moved in the opposite direction or returned to their normal positions by means of an elastic member 157 (see Figs. 2 and 4), one extremity of which is secured to a fixed support and the other extremity to the shaft 112 in such a manner as to impart a return movement to the latter. As the shaft 112 is returned, the arm 151 (see Fig. 4) will engage the arm 152, and thereby move the shaft 153 to its normal position. The arm 155 is secured to the shaft 153, so as to be longitudinally adjusted on the shaft to be moved into a position to be engaged by the cam 154 and also to be moved into a position so that it will not be engaged by the cam 154 for a purpose which will be hereinafter set forth.

The above described operations may be repeated as often as desired, and in order that the digits may be carried from one of the number bearing members to the next number bearing member of a higher denomination, suitable carrying mechanism is provided which will now be described.

Secured to each of the shafts 43 for rotation therewith and for longitudinal adjustment thereon, is a gear 158 (see Figs. 2, 5 and 9), each of which gear is provided with a hub or collar 159, of a diameter somewhat larger than the diameter of the shaft, to form a shoulder 160.

As the construction and operation of all of the carrying mechanisms is the same, the specific description of one will apply equally as well to them all. Secured to each of the shafts 42 and in close proximity to the gear 158 is a one-toothed gear 161, and these gears 161 are fixed upon the shafts, while the gear 158 is adapted to be adjusted longitudinally on the shaft 43, and laterally with respect to the gear 161, so as to be moved into a position to be engaged by the one tooth of the gear 161 and also into a position so that it will not be engaged by the gear 161 when the shaft 43 is rotated. An elastic member 162 is provided which is preferably supported by the shaft 43 and is disposed between the gear 158 and the gear 72, and this elastic member tends normally to move the gear 158 into a position where the gear 161 will mesh therewith, and when in this latter position and the shaft 42 is rotated, one step of rotation will be imparted to the shaft 43 and the gear 72, which step will also be imparted to the gear 74 and to the number bearing member 44, through the medium of the shaft 76. The gear 158 is normally held out of engagement with the gear 161 or in a position out of mesh therewith by means of a dog 163 (see Figs. 2, 9, 10, 12 and 29), which is pivotally supported as at 164, adjacent one end of the number bearing member 44, and in such a position that when the arm 165 of the dog is behind the sleeve or hub 159 of the gear 158, and in engagement with the shoulder 160 thereof, the elastic member 162 will be held under tension, and the gear 158 will be held out of mesh with the gear 161. An elastic member 166 tends normally to move the arm 165 in a direction to pass behind the shoulder 160. It will, therefore, be apparent that when the arm 165 is rocked to be moved out of engagement with the shoulder 160, the elastic member 162 will shift the gear 158 so as to be engaged with the gear 161.

These dogs 163 are adapted to be rocked to automatically release the gears 158 as the number bearing members 44 approach the zero point, and in order to automatically accomplish this operation, there is provided on the number bearing member a tooth or projection 167 which is adapted to engage a projection 168 on the dog 163, and thereby rock the dog against the tension of the elastic member 166 to move the arm 165 out of engagement with the shoulder 160. Thus released, the gears 158 will automatically assume a position to permit a digit to be carried from one of the number bearing members to the next adjacent number bearing member. This operation of carrying from one of the number bearing members to another is accomplished after the calculation has taken place and before the shafts 42 have completed their revolution. After the digit has been carried and in order to render the carrying mechanism inactive, so that other amounts may be registered on the number bearing members, it is necessary to laterally displace the gear 158 with relation to the respective gear 161. This may be accomplished in any suitable manner but a simple and efficient means comprises a rock shaft 169 (see particularly Figs. 2, 9, 10 and 29), journaled in suitable supports and extending transversely with respect to the shafts 43 and located preferably below these shafts. This shaft 169 is provided with a plurality of arms or projections 171, (Fig. 9), one of which is located adjacent the shoulder 160 of each of the sleeves 159, as shown more clearly in Figs. 2 and 29, and an elastic member 171 is provided for moving shaft 169 in a direction to cause the arms or projections 170 to be moved out of engagement with the shoulders 159 of the sleeves of the gears 158, when the gears 158 are held in an inoperating position or the position shown in Fig. 2.

When the arms 165 of the dogs 163 are shifted to permit the elastic members 162 to adjust the gears 158, the shoulders 160 of the sleeves 159 of the gears 158 will be moved into close proximity to the arms 170 on the shaft 169. After the carrying operation the shaft 169 is rocked by means of a cam 172, which is secured to the mutilated gear shaft 42 of the highest denomination, and is so arranged on the shaft that just before completion of a complete revolution of this shaft, the cam 172 will engage an anti-friction roller 173 on the shaft 169 to rock the latter against the tension of the elastic member 171. After the arms 165 have been shifted to release the gears 158 and the latter have assumed their proper positions with respect to the gears 161, the elastic members 166 will cause the arms 165 to rest upon the upper surface of the sleeves 159, so that when the gears 158 are shifted into inoperating positions by the shaft 169, the elastic members 166 will cause the arms 165 to move into positions behind the shoulders 160 of the sleeves 159 and lock the latter in their adjusted positions. When one of these keys 84, 85, is actuated and in order to lock the actuated key during the calculations, (reference being had now more particularly to Figs. 14, 15 and 18,) a suitable locking mechanism is provided, which will prevent the actuation of the other of the keys after the machine is started to operate. This locking mechanism preferably comprises a locking dog 174 which is pivotally supported by any suitable support, and is provided with a nose or extremity 175 adapted to enter notches 176 in the slide bar 91, which latter is provided for rocking the toothed member or segment 82. An elastic member 177 is provided, one extremity of which is secured to the dog 174, and the other extremity to a suitable fixed support and tends normally to hold the nose or extremity 175 out of engagement with the notch 176, thereby permitting the free adjustment or actuation of either of the keys 84, 85. It is thought that the operation of the above described portion of the mechanism will be clearly understood from the description. Briefly stated it is as follows: Assuming the parts to be in position as shown in Fig. 2, and it is desired to register amounts on the number bearing members 44, it is first necessary to depress or actuate one of the keys 84, 85 (see Fig. 1), which keys indicate debits or credits or amounts to be added or subtracted from the number bearing members. As shown in Fig. 2, the debit key 84 has been actuated to rock the toothed member or segment 82 to shift the sleeves or collars 78 so that the gears 75 will be locked to the shafts 76. Obviously, if it is desired to add any amount to the amounts already indicated or registered on the number bearing members 44, the credit key 85 must be depressed or actuated and in this event the sleeves or collars 78 will be shifted so as to release the gears 75 and lock the gears 74 to the shaft 76, and thereby cause the shaft 76 to rotate in the direction opposite to the direction in which it would rotate when the gears 75 are locked.

After the machine has been set so as to indicate debits or credits as the case may be, the slide bar 91 will be automatically locked by the dog 174. In order to accomplish this automatic locking movement, mechanism must be provided for rocking the dog 174 to move the nose or extremity 175 into one of the notches, and this may be accomplished by means of a cam 178 secured to the mutilated gear shaft 42 of the highest denomination, so that just as the shaft 42 begins to rotate, the high portion of the cam 176 will move into engagement with the extremity of an arm 179 on the dog 174 and rock the latter against the tension of the elastic member 177. This high portion of the cam 178 is of such a length as to hold the nose or extremity 175 within the respective notches 176 until the shaft 42 has completed its revolution, at which time the low portion of the cam will be adjacent the extremity of the arm 179 of the dog, and the elastic member 177 will force such extremity against the low portion of the cam, to withdraw the nose or extremity 175 from the notch or recess 176. It will thus be seen that when either of the keys 84, 85, is actuated both will be positively locked in their adjusted positions.

With the parts thus adjusted the operator then actuates the desired keys 41 in the respective series, according to amounts to be registered, it being understood that the shaft 49, designated as the running shaft, is continuously operated by the motor 50. As the respective keys 41 are actuated, the selecting slide 99 will be first released by the rocking of the shaft 118 (reference being still had to Fig. 2) to move the arm 117 out of the path of movement of the slide under the tension of the elastic member 116. Thus released the slide 99 will move until its movement is arrested by the engagement of one of the pins or projections 102 with the pin or projection 107 on the actuated key 41, so that the gear 71 will be properly positioned with respect to the mutilated gears 70 in accordance with the actuated key.

After one key 41 of each of the series or of the desired series has been actuated, the parts are then in position to communicate or impart the desired number of steps of rotation to the number bearing members 44, and all that is necessary in order to impart motion to the shafts 42 is to render the clutch between the running shaft 49 and the shaft 62 active. This is accomplished by the controller key 123, the actuation of which will rock the shaft 124 (reference being now had to Figs. 4 and 5, 6 and 7). As the shaft 124 is rocked by the actuation of controller key 123, the dog 66 will be tripped so that its extremity will be moved out of engagement with the shoulder 67 on the dog 60, and allow the latter to move under the influence of the elastic member 61 into engagement with the star or toothed wheel 59. This will lock the gear 54 to the shaft 49 and as this gear 54 meshes with a gear 63 on the shaft 62, the rotation of the gear 54 will rotate the gear 63, and consequently the shaft 62. As the shaft 62 is rotated the shaft 45 will be correspondingly rotated through the medium of the intermeshing gears 64, 65, and the rotation of the shaft 45 will through the medium of the intermeshing gears 46, 47, be imparted to the mutilated gear shafts 42. As these latter shafts are rotated, the gears 71 will be rotated a number of steps equal to the number of teeth on the mutilated gear 70, above which the gears 71 are located, and the corresponding number of steps of rotation imparted to the shafts 43 will be imparted to the number bearing members 44 through the medium of the intermeshing gears 73, 77, 75 or 72, 74, according to which train of gears is rendered active.

The shafts 43 may be locked against overthrow by means of dogs 180 (see particularly Figs. 2 and 8), arranged between the shafts 43 and the respective shafts 42. These dogs are pivotally mounted on any suitable support, preferably the support 37, and are provided with a projecting portion 181, adapted to enter the notches in a star or toothed wheel 182, secured to the respective shafts 43. Secured to each of the shafts 42 is a cam 183, each of which is provided with a high portion and a low portion, the high portion being adapted to engage a projecting portion 184 on the respective dogs 180, to move the projecting portions 181 into the notches in the star or toothed wheels, and the low portions of the cams are adapted to receive the projecting portions 184 of the respective dogs 180 to permit the projecting portions 181 to move out of the notches in the star or toothed wheels, and thereby release the shafts 43 so that they may be freely rotated. The cams 183 on the shafts 42 are so arranged with respect to each other that the high portions will operate successively on the respective dogs 180, so as to permit the carrying to be effected from one of the number bearing members 44 to the other, as will be understood.

The keys of all of the series in which the actuated keys are located will be locked against actuation by the slides 99, owing to the fact that the recesses 101 will move out of alinement with the pin or projections 107 on the stems of the remaining keys, and in order to lock all of the keys of the series which are not employed or actuated to register amounts on the number bearing members 44, the locking member or slide 129 is provided, and this locking member is adjusted so as to lock these keys just as the controller key 123 starts to actuate, that is to say, during the first portion of the rocking movement of the shaft 124 the arm 142 (see Fig. 6) will rock the bell crank lever 135 and shift the slide or member 129 to move the laterally projecting portions 132 thereon beneath the arms or projections 117 on those of the shafts 118 which have not been rocked by the actuation of the keys 41 of the respective series. By the time this member 129 reaches its locking position, the further rocking movement of the shaft 124 will effect the tripping of the pawl or dog 66 (see Fig. 8) owing to the fact that the pin or projection 144 on the arm 143 of the dog or pawl 66 is normally spaced from the upper end of the slot 145 in the arm or projection 145ª on the shaft 124 so that during the first portion of the movement of the shaft 124 to shift the member 129, the upper end of the slot 145 is moved toward the pin or projection 144 on the dog 66. By the time this end of the slot 145 engages the pin or projection 144, the member 129 will have assumed its locking position and a further movement of the shaft 124 in the same direction will effect the tripping of the pawl or dog 66 through the medium of the interengaging pins or projections 144, 145.

As the number bearing members 44 rotate, the carrying from one to another will be effected through the medium of the dogs 163 (see Figs. 2, 10 and 29), and the projections or cams 167 on the number bearing members 44, which projections rock the respective dogs 163 to release the respective gears 158 and to permit the latter through the medium of the elastic members 162 to assume positions in the path of movement of the one toothed gears 161 on the shafts 42. These cams or projections 167 on the number bearing members 44 are so located that they will operate on the respective dogs 163 just at the completion of the calculation and before the shafts 42 have made a complete revolution. The carrying mechanism is also rendered inactive by the shifting of the gears 158 laterally to move them out of the path of the one tooth of the respective gears 161 before the shafts 42 have made a complete revolution, but this operation is effected after the carrying has been completed, and is accomplished by the cam 172 (reference being had particularly to Figs. 2 and 10), which cam engages the anti-friction roller 173 on the shaft 169 to rock the latter, and thereby move the arms or projections 170 into engagement with the shoulders 160 on the sleeves 159 of the gears 158 to shift the latter against the tension of the elastic members 162 and to permit the arms 165 of the dogs 163 to assume positions behind the shoulders 160 and thereby lock the gears 158 in inoperating positions.

After the completion of the calculation and the carrying operations, the dog 66 of the coupling mechanism between the shafts 49 and 62 (see Fig. 8) will be automatically released, and the cams 146 and 147 will be in such positions with respect to the arms 148, 149 to permit the shaft 124 to rock in the opposite direction under the influence of the elastic member 127 (see Fig. 6) to return the controller key 123 and to permit the elastic member 133 to move the member 129 to unlock the keys 41. During the latter portion of the revolution of the shaft 49, the cam 154 on the shaft 162 (see Figs. 2, 3, 4 and 7) will move into engagement with the anti-friction roller 156 on the arm 155 of the shaft 153 to rock the latter and thereby cause the arm 152 on the shaft 153 to move into engagement with and to shift the arm 151 on the shaft 112 to rock the latter. As this shaft 112 is rocked under the influence of the arm 152 the pin or projections on the shaft will move into engagement with the body portion of the members 111 and rock the member 111 to move the slides 99 into the position shown in Fig. 2 so as to release the actuated keys 41 and shift the gears 71 into such positions that they will not be engaged by any of the gears 61 on the respective shafts 42. At the same time the keys 41 are released, the extremity of the members 99 will be moved in such positions that the arms 117 on the shafts 118, after they have been released by the member 129, will move into the path of movement of the end of the respective slides 99 to lock the latter in the position shown in Fig. 2.

It sometimes happens that one or more of the keys 41 is actuated by mistake and unless they are returned or restored to their normal positions, the result of the calculation indicated on the number bearing members 44 will not be correct. Therefore, in order to obviate this danger, suitable mechanism is provided for automatically restoring the parts which have been actuated by mistake, and comprises what might be termed an error key 185 (see Figs. 1, 3, 4, 5, 6, 7 and 13), which is located in a convenient position for the operator and preferably adjacent the controller key 123, shown more particularly in Figs. 1 and 3.

This error key should, therefore, control the movement of the shaft 153, inasmuch as this shaft must be actuated to rock the shaft 112 to return the slides 99 which have been adjusted by the actuation of the improper key, and inasmuch as this shaft 153 is rocked through the medium of the cam 154, which latter receives its motion from the shaft 49 when the controller key 123 is actuated, it is apparent that if such movement is derived by the actuation of the controller key 123, the entire mechanism would be actuated and the improper amount would be registered on the number bearing member 44. Therefore, in order to overcome this objection and to provide means whereby the shaft 153 may be actuated from the running shaft 49 without actuating the mutilated gear shafts 42, a separate and normally inoperative connection is provided between the shaft 49 and the shaft 153, and comprises a cam 186 (shown more clearly in Figs. 3, 5, and 21), which is mounted loosely upon the shaft 62. Secured to the cam 186 for rotation therewith and also loosely mounted upon the shaft 62 is a gear 187, which gear meshes with a gear 188, also loosely mounted on the running shaft 49 (shown more clearly in Fig. 3).

A normally inactive clutch, similar to the clutch between the gear 54 and the shaft 49, (shown in Fig. 7) is provided between the gear 188 and the shaft 49 and comprises a disk 189 on which is pivotally mounted a dog 190, similar to the dog 66. This dog 190 coöperates with a star or toothed wheel 191, similar to the star or toothed wheel 59, which latter is secured to the shaft 49 for rotation therewith. A yoke-shaped member 192 is pivotally supported upon a suitable support, preferably the rock shaft 124 and is located between spaced collars 193, secured to the shaft and which collars prevent displacement of the yoke-shaped member longitudinally on the shaft. One arm of the yoke-shaped member is shaped so as to form a dog 194 (see Figs. 3, 4 and 28), which is adapted to coöperate with the dog 190 to move and hold the latter out of engagement with the star or toothed wheel 191, and thereby render the gear 188 inactive. The other arm of the yoke-shaped member 192 is formed to project in a direction opposite to that in which the dog 194 projects, and to this projecting portion 195, the stem of the error key 185 is pivotally connected so that when the error key is actuated or depressed, the yoke-shaped member 192 will be rocked to release the dog 190, and thereby lock the gear 188 to the shaft 49. When thus released, the gear 187 and the cam 186 will be rotated (see Figs. 3, 5 and 21), and when so rotated the cam 186 will engage the anti-friction roller 156 on the arm 155 to rock the shaft 153 to cause the arm 152 to engage and move the arm 151, and consequently the shaft 112, the rocking motion of which shaft 112 will move the members 99 to their normal positions to release the actuated keys 41 in a manner already set forth. Thus it will be seen the key which has been actuated by mistake may be returned without imparting motion to the shafts 42. In order to lock the error key (in a manner to be more fully set forth), when the controller key is actuated, there is provided on the shaft 49 a cam 196 (see particularly Figs. 3, 5 and 24), which is secured to the gear 188 so as to rotate with the gear when the latter is locked to the shaft. The cam 196 coöperates with an arm 197, which is secured to the dog 194 and projects therebeyond and into a position that the high portion of the cam 196 will engage the arm after the dog 194 has been tripped, and will hold this dog as well as the yoke 192, and the error key 185, in their adjusted positions. After the keys have been restored by the elastic members 110 (Fig. 30) when released by the members 99, the low portion of the cam 196 will be moved into position adjacent the arm 197 and an elastic member 198, such as a coil spring or the like, will tend to move the yoke 192 in the direction opposite to the direction in which it is moved by the cam and the arm 197 into engagement with the low portion of the cam, as well as move the dog 194 in a position that will trip the dog 190. This movement of the yoke-shaped member will also return the error key to a normal position.

After the keys 41 have been restored to their normal positions, all the parts will be at rest, except the running shaft 49 and then the proper key may be actuated to adjust the gears 71.

The gear 188 may be locked against overthrow by means of a dog 199, pivotally supported on a suitable support 200 (see Fig. 3) which engages in a notch in the periphery of the disk 189, similar to the dog 57, which coöperates with the disk 55 (see Fig. 7).

As has already been explained, this mechanism is adapted for what might be termed addition and subtraction, that is to say, the number bearing members 44 may be adjusted to be rotated in one direction to add to the amounts already registered thereon and the mechanism may also be adjusted to be rotated in the opposite direction to subtract an amount from the numbers already registered thereon. It has also been explained that the two series of numbers 68, 69, on the number bearing members are differentiated from each other, one of the series indicating debit and the other series indicating credits. These numbers on the number bearing members are exposed through a suitable opening in the casing which incloses all of the mechanism, and which opening is provided with a transparent closure 201 (see Fig. 2). In order to indicate or direct the attention of the operator to the series of numbers which is to be read, a shiftable indicator or shield 202 is provided, and this indicator or shield is itself provided with two series of apertures or openings 203, 204, one in each series for each of the number bearing members 44, and these apertures or openings 203, 204, are preferably arranged in a staggered relation with respect to each other, as shown.

The indicator or shield is mounted in any suitable manner so as to be adjusted longitudinally, preferably by means of bolts or fastening devices 205, which pass through elongated slots or openings 206 in the indicator or shield and into a fixed support. The shield is adapted to be automatically shifted so as to expose one of the other series of numbers in any suitable manner, but preferably from the shaft 76 of the number bearing member 44 of the highest denomination. On the shaft of the highest denomination is provided a lug or projection 207, (see Figs. 2, 9, 10, 19, 20) and this lug or projection is preferably formed on a portion of the number bearing member 44. Pivotally mounted upon the indicator or shield 202 and spaced from each other are dogs 208, 209, each of which is adapted to yield when the projection 207 engages the same during the rotation of the shaft 76 in one direction and to form an abutment or rigid projection in the path of movement of the projection 207 when the shaft 76 is rotated in the opposite direction, so that when the shaft is rotated in one direction to shift the indicator or shield 202 in one direction, the projection 207 will pass one of the dogs 208, 209, and engage the extremity of the other to shift the indicator. When the shaft is rotated in the opposite direction, the projection 207 will engage the other dog 208, 209, and move the indicator in the opposite direction.

Owing to the mechanical construction and the relation of the numbers of the two series on the number bearing members with respect to each other, the amount registered on the number bearing members by operation of the mechanism will be incorrect to the extent of one cent when the shield or indicator is shifted from one of the series to the other, by the engagement of the projection 207 on the shaft 76 engaging either of the dogs 207, 208, which shifting movement takes place just as the number bearing member of the highest denomination crosses the zero point in either direction. In order, therefore, to indicate a correct amount on the number bearing members, it is necessary to supply this additional digit and mechanism for automatically accomplishing this result when the indicator or shield is shifted will now be described. This additional digit is supplied to the units number bearing member 44, and for this purpose one of the gears 158 is arranged on the shaft 43 beneath the units number bearing member 44, as shown more clearly in Figs. 5 and 9, and one of the dogs 163 is pivotally supported adjacent the units number bearing member 44, so that the arm 165 may pass behind the shoulder on the gear 158 and lock the latter in an inoperating position in the same manner as the remaining gears 158, and as shown more clearly in Figs. 2, 9 and 10. The indicator or shield 202 is provided with notches 210 into which the nose or extremity 211 of a pivotally supported dog 212 projects, and this dog 212 is provided with an arm 213, to which is connected one extremity of an elastic member 214. The other extremity of the elastic member is anchored to a suitable fixed support and tends normally to move the extremity 211 of the dog into the notches. This elastic member is of sufficient tension to hold the extremity of the dog seated but will yield when pressure is exerted upon the indicator or slide, so as to permit the extremity 211 of the dog 212 to pass out of one of the notches 210 into the other, as shown more clearly in Fig. 19. The dog 163 of the units number bearing member is adapted to be tripped by means of an arm 215 (see Figs. 5 and 9) secured to a rock shaft 216, journaled in suitable supports, and which shaft is adapted to be rocked by means of an arm 217 secured thereto (see also Fig. 25) with which latter a cam 218 on the shaft 49 coöperates. The cam 218 is mounted loosely on the shaft 49 and is secured to a disk 219, also loosely mounted on the shaft 49. A dog 220 is pivotally supported by the disk and coöperates with a star or toothed wheel 221, secured to and for rotation with the shaft 49. The dog 220 is provided with a shoulder 222 (see Fig. 9), with which the dog 223 coöperates for moving the dog 220 out of engagement with the star or toothed wheel 221. The dog 223 is pivotally mounted to a fixed support, preferably loosely upon the rock shaft 216 and an arm 224 is formed integral with the dog 223 and projects for some distance beyond the shaft 216 (see also Fig. 3.) This arm 224 is provided with an inclined portion 225 and an elastic member 226 is connected to a portion of the arm 224 and to a fixed support and tends normally to move the dog 223 into a position to engage the shoulder 222 of the dog 220 to move the latter out of engagement with the star or toothed wheel 221 and thereby unlock the disk 219 and the cam 218 with respect to the shaft 49. A dog 227 coöperates with a notched portion 228 in the periphery of the disk 219 to lock the disk 219 and the cam 218 against overthrow, and an elastic member 229 is provided for controlling the dog 227.

A member 230 for a purpose to be hereinafter set forth is slidingly mounted upon a fixed support by means of fastening the device 231, passing through suitable slides 232, in the member, and this member is provided with a projecting portion 233 to which is pivoted intermediate its ends a member 234. One extremity of this member 234 projects between the arm 213 of the dog 212 and the inclined portion 225 of the arm 224, and an elastic member 235 is connected by one extremity to the member 234 and by its other extremity to the member 230, and tends normally to move the member 234 away from the inclined portion 225 of the arm 224 and toward the arm 213 of the dog 212. This member 234 projects through an elongated opening or slot 236 in the support 37. Thus it will be seen that with the parts in the position shown in Figs. 5, 9 and 19, when the shield or indicator 202 is shifted, the dog 212 will be rocked about its point of pivotal support and this will force the arm 213 into engagement with the extremity of the member 234, and the member 234 will be rocked about its point of pivotal connection with the member 230, and will be forced into engagement with the inclined portion 225 of the arm 224 to rock the latter about the shaft 216 against the tension of the elastic member 226. When this arm 224 is thus rocked, the dog 223, which is integrally connected therewith, will also be rocked to be moved out of engagement with the shoulder 222 on the dog 220 and this will release the latter to lock the disk 219 and the cam 218 for rotation with the shaft 49. As the shaft 49 rotates the cam 218 (see also Figs. 3 and 25) will engage and elevate the arm 217 to raise the arm 215 so that the dog which controls the gear 158 of the units number bearing member 44 will be tripped to release the gear 158, and thereby permit the latter to move into a position to be engaged by the one toothed gear 161 on the shaft 42, which is located beneath the units number bearing member 44 to impart one step of rotation to the units number bearing member, when the machine is set in operation. After the dog 223 has been thus rocked, the nose or extremity 211 of the dog 212 will pass into another of the notches 210 in the indicator or shield 202 (see Fig. 19) which will permit the arm 213 to be moved in a direction away from the inclined portion 225 of the arm 224 to permit the elastic member 235 to act upon the member 234 so that the latter will also move away from the inclined portion to permit the elastic member 226 to move the arm 224 in the opposite direction and position the dog 223 to trip the dog 220, and thereby release the disk 219 and the cam 218 with respect to the shaft 49. After this latter operation all the parts will be released and will remain idle except the running shaft 49.

In order to impart rotation to the number bearing members 44 so that the latter may be actuated to add this additional digit, after the gear 158 under the units number bearing member 44 has been adjusted into operating position, the shaft 62, which imparts motion to the shafts 42, must be rotated, and therefore in the present exemplification of the invention, it is necessary to trip or render active the normally inactive coupling or connection between the running shaft 49 and the shaft 42, which coupling comprises the meshing gears 63, 54, the disk 55, the dog 60 and the star or toothed wheel 59, (see Figs. 5 and 8). This operation might be accomplished by actuating the controller key 123 after the parts have been adjusted, as just described, but in order to automatically render this coupling or connection active, suitable mechanism is provided whereby the dog 60 will be automatically released by the actuation of the shaft 216. For this purpose there is provided on the shaft 216 an arm 216$^a$, which is secured thereto, and the dog 66 is provided with a laterally projecting pin or arm 66$^a$, which projects over and into the path of movement of the arm 216. The projection 66$^a$ on the dog 66 is arranged above the arm 216$^a$, so that when the controller key 123 is actuated to set the mechanism in motion, the arm 216$^a$ and the lateral projection 66$^a$ will not interfere with the free operation of the dog but when the shaft 216 is rocked by the cam 218 and the arm 217 (see Figs. 5 and 25), the arm will engage the projection 66$^a$ to rock the dog 66 and thereby render the coupling or connection controlled by this dog 66 active without operating the controller key 123. This automatic tripping of the dog 66 by the arm 216$^a$ will be effected just after the arm 215 on the shaft 216 (see Figs. 5, 8 and 29) has tripped the dog 163, which controls the gear 158 beneath the units bearing member 44. After the complete cycle of movement of the parts, the dog 60 will be automatically tripped again to render the coupling or connection between the shaft 49 and the shaft 62 inactive and the shaft 216 with the arms 215 and 216$^a$ will be automatically returned to their normal positions by the tension of the elastic member 166, which latter returns the dog 163 of the units number bearing member gear 158, and which elastic member acts on the shaft 216 through the medium of the dog 153 and the arm 215. (See Fig. 10.) Thus it will be seen that when the indicator or shield 202 is shifted in either direction, the units number bearing member 44 will be automatically rotated one step to register the missing digit thereon, and thereby correct or indicate the proper amount on the number bearing members.

In order to avoid damage to the machine, mechanism should be provided for locking the controller key 123, when the error key 185 is being actuated, and likewise locking the error key when the controller key is being actuated, and suitable mechanism for accomplishing this will now be described, reference being had more particularly to Figs. 3, 4, 13 and 16 of the drawings.

Pivotally supported upon any suitable fixed support and adjacent the yoke-shaped member 192 on the shaft 124 is a dog 237, which is provided with a shoulder extremity 238, adapted to be moved into a position within the path of movement of the body portion of the yoke 192, and an elastic member 239 is provided which holds this portion 238 out of the path of movement of the yoke 192. When the error key is actuated in the manner already described, the yoke 192 is rocked by the error key to shift the dog 194, but when the controller key 123 is operated to throw the connecting mechanisms into operating positions, it will be remembered that the shaft 124 is itself rocked directly from the controller key 123. With the dog or member 237 in the position shown in Fig. 16, and when the error key 185 (see also Fig. 3) is depressed, the yoke 193 will be moved into a position beneath the shouldered extremity 238 of the dog 237 and the dog 237 will be held in this position and against movement by means of the cam 196 on the shaft 49, which cam engages the arm 197 on the member 192 (see Fig. 24). Projecting laterally from this dog 237 is an arm or extension 240 with which an arm or extension 241 on the shaft 124 coöperates. It will therefore be apparent that when the yoke 192 is moved beneath the shoulder extremity 238 of the dog 237, the latter will be held against movement, and as the arm or projection 241 on the shaft 124 rests against the lateral projection 240 on the dog 237, and the latter being held against movement, the shaft 124 will also be locked against movement and cannot be actuated by the controller key 123 until the yoke 192 is moved from beneath the shoulder extremity 238 of the dog. Thus when the error key is actuated, it will be seen that the controller key can not be actuated.

When the parts are released to assume their normal positions, the yoke 192 will be moved into the position shown in Fig. 16 by the elastic member 198 (see Fig. 3), as has already been described, so that the dog 237 will be free to move when the arm or projection 241 is forced into engagement with the lateral projection 240 on the dog. Therefore, when this shaft 124 is rocked by the controller key 123, the dog 237 will be moved about its point of pivotal support against the tension of the elastic member 239 through the medium of the interengaging pins or projections 241, 240, and a continued movement of the shaft 124 in the same direction will cause the shoulder extremity of the dog to be moved behind or into the path of movement of the yoke 192, and thereby lock the yoke, and consequently the dog 194 against movement by the actuation of the error key 185. When the parts are released to assume their normal positions, the shaft 124 will be returned in the manner already set forth, and the dog 237 will be returned to its inoperating position by the elastic member 239.

In the present exemplification of the invention, the operation of multiplication may be effected by the repeated addition of the amounts to be registered and the operation of division may be effected by the repeated subtraction of the amounts.

As has already been described when the keys 41 have been actuated to register a specified amount and the machine set into operation by the actuation of the controller key 123, the shafts which impart a variable movement or rotation to the number bearing members 44 will make one complete revolution, and then all of the parts will be automatically released and restored to their normal positions. In order, therefore, to add a similar amount to the number bearing members of the totalizer under these conditions it will be necessary for the operator to again actuate the same keys and repeat this operation until the amount has been registered the desired number of times to complete the multiplication. In order, therefore, to prevent the parts or mechanisms which impart the variable movements to the respective number bearing members 44 from being restored to their normal positions after the amount has been once registered and to maintain the parts in the position to repeatedly add the same amount to the number bearing members, suitable mechanism must be provided for preventing the parts from being shifted or returned to their normal positions after the completion of one cycle of movement of the operating shafts and such mechanism will now be described.

As has already been stated, the arm 155 (see particularly Figs. 3, 5 and 7) is mounted for adjustment longitudinally on the shaft 153, but in its former position it is arranged within the path of movement of the cam 154, which is fastened to the shaft 62 for rotation therewith. Each time this shaft rotates, the cam 154 will engage the arm 155 to rock the shaft 153 and thereby restore all of the keys 41 which have been actuated to their normal positions in the manner already set forth. In order, therefore, to prevent this cam 154 from engaging this arm 155 during the multiplication operation, the arm 154 is shifted longitudinally on the shaft 153 so that it will assume a position out of the path of movement of the cam 154, and in this position it will be apparent that the shaft 62 may rotate any desired number of times without restoring the keys 41 as long as the arm 155 is maintained in this latter position. In order, therefore, to shift the arm 155 on the shaft 153 the member 230, which is slidably mounted on its support, is provided with a depending arm or projection 242, as shown more clearly in Figs. 5 and 22, which latter is provided with a laterally projecting pin or lug 243, extending into a circumferential groove 244 in a portion of the arm 155. When this member 230, therefore, is adjusted so as to slide in one direction or the other, it will be apparent that the arm 155 and the anti-friction roller 156 will be likewise adjusted longitudinally on the shaft 153 and can, therefore, be moved into or out of the path of movement of the cam 154. This sliding movement of the arm 155 and the slide 230 may be accomplished in any desired or suitable manner, but preferably by means of a key 245, which for the sake of convenience will be hereinafter designated as a repeat key, indicating that it is operated when it is desired to repeat the additions without throwing the mechanisms out of actuation. This repeat key 245 is located in any convenient position for the operator but preferably adjacent the controller key 123, and is connected in any suitable manner to one end of a lever 246 pivotally mounted as at 247 to a fixed support (see also Fig. 32). This lever is provided with a depending bifurcated portion 248 which latter is adapted to stand astride of a laterally projecting pin 249 on a depending portion 250 of the slide 230, and an elastic member 251 is provided which is connected to one extremity of the lever and tends normally to move the slide 230 in a direction to shift the anti-friction roller 156 on the arm 155 into the path of movement of the cam 154. It will, therefore, be seen that when the key 245 is actuated or depressed, the lever 245 will be rocked about its point of pivotal support 247 against the tension of the elastic member 251 to swing the bifurcated depending portion 248 in a direction to shift the member 230 and thereby move the arm 155 longitudinally on the shaft 153 out of the path of movement of the cam 154.

The arm 155 (see Figs. 3 and 13) is held in its adjusted positions either within or out of the path of movement of the cam 154 by means of the elastic member 251, which is connected to the lever 246 in such a manner that when the latter is shifted to the position shown in Fig. 3, its point of connection with the lever 246 will pass above the point of pivotal support 247 or over the center and thus hold the parts in this position. When the lever 246 is rocked in the opposite direction to return the arm 155 so as to be engaged by the cam 154, the point of connection of the elastic member 251 with the lever will pass on the other side of the point of pivotal support 247 to retain the parts in this position. In order to thus shift the lever 246 in the opposite direction to return the arm 155 to a position to be engaged by the cam 154, an additional key 252 (see Figs. 1, 3 and 13) is provided and is arranged preferably adjacent the key 245. This key is provided with a pin or projection 252$^a$ adapted to engage the other extremity of the lever 246 on the side of the point of pivotal support 247 opposite to that on which the key 245 is located to rock the lever 246 in a direction opposite to that in which it is rocked by the key 245.

The anti-friction roller 156 (see Fig. 3) is of such a length that a portion thereof will always stand within the path of movement of the cam 186, which latter is loosely mounted on the shaft 62 so that after the arm 155 has been adjusted by the "repeat key" 245, the mechanism may be set in operation by the actuation of the controller key 123, the actuation of which will cause the gear 54 to be locked to the shaft 49 and thereby impart motion to the gear 63, and the mechanism controlled by this latter gear (see particularly Figs. 3 and 5).

The shafts 42 may be caused to repeat any desired number of times according to the will of the operator and may be effected when the parts are adjusted, as just described, by a repeated depression or actuation of the controller key 123 until the amount has been registered the desired number of times, or, if desired, the controller key 123 may be actuated or depressed and held depressed until the amount has been registered the desired number of times. This may be ascertained by the operator by observing the number of times the shafts 42 rotate, which may be readily done by listening to the operation of the machine.

It will be apparent that it is also necessary to prevent the actuation of the dog 223 (see Fig. 9) by the shifting of the indicator or shield 202 during the operation of multiplication or repeated addition of amounts to the number bearing members, and inasmuch as the dog 223 is actuated by the shifting of this indicator or shield by forcing the member 234 (see also Figs. 5 and 19) against the inclined portion 225 of the arm 224, it is necessary to withdraw this member 234 to a position where it will not be engaged by the arm 213 of the dog 212 and forced into engagement with the inclined portion 225 of the arm 224. For this reason, therefore, this member 234 is supported by the member 230 so that when the latter is shifted by the "repeat key" 245 to shift the arm 155 out of the path of movement of the cam 154, the member 234 will be withdrawn to a position so that it will not be forced into engagement with the inclined portion 225 of the arm 224 when the indicator or shield 202 is shifted during the operation of multiplication. After this operation has been completed, the mechanisms are returned to their normal positions, and this may be effected by the actuation of the "release key" 252, which shifts the lever 246 and the member 230 in the manner already set forth. The operation of this key will set some of the parts so that they may be returned to their normal positions, but the keys of the series 41, which have been actuated, will not be returned to their normal positions, and, therefore, it is necessary that motion be imparted to the shaft 124. If this motion should at this time be imparted to the shaft 124 by the actuation of the controller key 123, the number bearing members 44 would be actuated and the amounts indicated by the actuated keys 41 would be again registered. In order, therefore, to return the keys 41 without actuating the number bearing members 44, the shaft 124 is set in motion when the "repeat release key" 252 is actuated, by actuating the coupling or connection between the running shaft 49 and the cam 185, which is controlled by the "error" key 185. This is accomplished by means of a connection between the stem of the "repeat release key" 252 (see particularly Figs. 3 and 31) and preferably comprises an arm or projection 253 on the stem of the "repeat release key", which engages with a similar arm or projection 254 on the stem of the "error key" 185. These arms or projections 253, 254, are arranged so that their extremities will over-lap and are preferably shouldered as shown, and over lap in such a manner that when the "repeat release key" 252 is actuated, the arm or projection 253 thereon will engage the arm or projection 254 on the "error key" 185 to simultaneously depress the latter and thereby rock the yoke 192 and the dog 194 to couple the gear 188 to the shaft 49 (see also Fig. 5), and thereby impart motion to the cam 186, which will engage the anti-friction roller 156 on the arm 155 (see Figs. 3, 5 and 7) to rock the shaft 153 and the arm 152. This motion of the arm 152 will cause it to engage the arm 151 on the shaft 112 (see Figs. 2 and 4) to move the arms or projections 150 into engagement with the yoke-shaped members 111 to rock the latter, and thereby shift the slides 99 to release the keys 41.

The controller key 123 will be held elevated by the elastic member or spring 127, as it tends to rock the shaft 124 in a direction to move the controller key 123 upwardly. In order, therefore, to provide positive means for returning the controller key 123 after the completion of the multiplication, or the repeated additions, there is provided on the shaft 124 an arm $124^a$ (see Figs. 4 and 6), which arm projects into the path of movement of an arm $112^a$ on the shaft 112. The arm $112^a$ is normally spaced some distance below the arm $124^a$ so that the shaft 124 may be rocked when the controller key 123 is actuated. It will therefore be seen that when motion is imparted to the shaft 112 through the medium of the arm 152 engaging the arm 151, the arm $112^a$ on the shaft 112 will engage the arm $124^a$, which latter has been moved toward the arm $112^a$ by the operation of the controller key, and thereby rock the shaft 124 in the opposite direction, which will positively return the space bar 123.

Mechanism has already been described for locking the controller key 123 against actuation when the error key 185 is actuated and for also locking the error key when the space bar is being actuated. In order to avoid any damage to the machine which might be caused by the actuation of the error key or the space bar when the machine is at rest, and the running shaft is also at rest, the pin and slot connection 144, 145 between the arm 143 on the dog 66 and the shaft 124 (see Figs. 7 and 8) is provided, and it will be apparent that when the running shaft is at rest, should the controller key 123 be actuated, the shaft 124 will be rocked until the upper end of the slot 145 in the arm $145^a$ on the shaft 124 engages with the pin 144 on the dog 66. This engagement of the end of the slot 145 with this pin will rock the dog 66 to cause its extremity to move out of engagement with the shoulder 67 on the dog 60, thereby permitting the elastic member 61 (see particularly Fig. 8) to move the extremity of the dog 60 into engagement with the spur or toothed wheel 59. As the dog 60 is thus moved, the portion 67 forming the shoulder on the dog 60 will pass under the extremity of the dog 66, so that when the controller key is released, the extremity of the dog 66 will rest on the shoulder. In this position it will be apparent that the upper end of the slot 145 will be maintained in such a position that the engagement of the pin or projection 144 with the upper end of the slot 145 will prevent the controller from returning. The slot 145 is so arranged that when the dog 66 is in the position just described, the locking member 237 (see Fig. 16) and the yoke 192 will be in such positions with respect to each other as to lock the error key against actuation. With the parts in this locked position, it will be apparent that the operator's attention will be drawn to the fact that the machine has been tampered with, by the fact that the controller key 123 or the error key, are not returned to their normal positions. In order to prepare the machine for operation, and with the parts in the position just described, all that is necessary is to start the motor so that the running shaft 49 will make one complete revolution and the parts will be restored in the manner already set forth.

If desired, and in order to prevent jarring of the parts by the sudden return of the arm 152 on the shaft 153, and also of the arm 151 on the shaft 112, a suitable cushion or buffer 255 may be provided for the arms to strike against.

All of the mechanism is located within a suitable casing 256 with the exception of a portion of the operating shaft 149, which preferably extends through one wall thereof, and the motor 50, and also the various keys comprising the series 41, the debit and credit keys 84, 85. The controller key 123, the "repeat" and "repeat release" keys 245, 253, and the "error" key 185, the stems of all of which project through the top of the casing so that the keys will be located outside of the casing and in convenient positions for the operator. These keys are all preferably located in advance of the transparent collars 201 through which the series of numbers 68, 69, on the number bearing members 44 are visible.

What is claimed as new is—

1. In a calculating machine, the combination of a totalizer comprising a series of coöperating number bearing wheels, mechanism for operating each of said wheels, a series of keys for each wheel, selector mechanism actuated by the keys for controlling the degree of movement of the respective number bearing wheels, means coöperating with the selector mechanism for locking the actuated key in its actuated position and for locking the remaining keys of the respective series against actuation, a controlling key for controlling the operation of the number bearing wheels, means actuated by the controlling key to lock the remaining unactuated keys against actuation in advance of the operation of the number bearing wheels, and means for restoring the last said means to release the keys locked thereby, the last recited means including mechanism for returning the said controlling key.

2. In a calculating machine, the combination of a totalizer comprising a series of coöperating number bearing wheels, power mechanism, operating mechanism between the power mechanism and the said number bearing wheels including a normally inactive coupling, a series of keys for each of the wheels, selector mechanism controlled by each of the series, means operatively related to the selector mechanism for locking the actuated key and the remaining keys of the respective series against actuation, a controlling key, a loose connection between the controlling key and the said coupling to permit an independent movement of the key without actuating the coupling, and means controlled by such independent movement to lock the remaining unactuated keys against operation.

3. In a calculating machine the combination of a totalizer comprising a series of coöperating number bearing wheels, power mechanism, operating mechanism between the power mechanism and the said number bearing wheels including a normally inactive coupling, a series of keys for each of the wheels, selector mechanism controlled by each of the series, means operatively related to the selector mechanism for locking the actuated key and the remaining keys of the respective series against actuation, a controlling key, a loose connection between the controlling key and the said coupling to permit an independent movement of the key without actuating the coupling, mechanism for locking the remaining unactuated keys against operation, and an operative connection between the last recited mechanism and the controlling key and operable thereby in advance of the operation of the said coupling by said key.

4. In a calculating machine, the combination of a totalizer comprising a series of coöperating number bearing wheels, power mechanism, operating mechanism between the power mechanism and the said number bearing wheels including a normally inactive coupling, a series of keys for each of the wheels, selector mechanism controlled by each of the series, means operatively related to the selector mechanism for locking the actuated key and the remaining keys of the respective series against actuation, a controlling key, a loose connection between the controlling key and the said coupling to permit an independent movement of the key without actuating the coupling, mechanism for locking the remaining unactuated keys against operation, an operative connection between the last recited mechanism and the controlling key and operable thereby in advance of the operation of the said coupling by said key, and means for restoring the said locking mechanism to release the keys locked thereby, the last recited means embodying means for returning the said controlling key.

5. In a calculating machine, the combination of a totalizer comprising a plurality of number bearing wheels, mechanism for actuating said wheels, a series of keys for each wheel, selector mechanism individual to each series of keys for controlling the degree of movement of the number wheels, means coöperating with the selector mechanism for locking the actuated key in its actuated position and for locking the unactuated keys of the respective series against actuation, a controlling key for controlling the operation of the number wheels, mechanism also actuated by the controlling key for locking the remaining unactuated keys against actuation, and means for restoring the last said locking means and the controlling key, and means for automatically restoring the selector mechanism.

6. In a calculating machine, the combination of a totalizer comprising a plurality of number bearing wheels, mechanism for actuating said wheels, a series of keys for each wheel, selector mechanism individual to each series of keys for controlling the degree of movement of the number wheels, means coöperating with the selector mechanism for locking the actuated key in its actuated position and for locking the unactuated keys of the respective series against actuation, a controlling key for controlling the operation of the number wheels, mechanism also actuated by the controlling key for locking the remaining unactuated keys against actuation, means for restoring the last said locking means and the controlling key, and positive means for automatically restoring the selector mechanism.

7. In a calculating machine, the combination of a totalizer comprising a plurality of number bearing wheels, mechanism for actuating said wheels, a series of keys for each wheel, selector mechanism individual to each series of keys for controlling the degree of movement of the number wheels, means coöperating with the selector mechanism for locking the actuated key in its actuated position and for locking the unactuated keys of the respective series against actuation, a controlling key for controlling the operation of the number wheels, mechanism also actuated by the controlling key for locking the remaining unactuated keys against actuation, means for restoring the last said locking means and the controlling key, positive means for automatically restoring the selector mechanism, and means for locking the latter in the restored position.

8. In a calculating machine, the combination of a toltalizer comprising a plurality of number bearing wheels, mechanism for actuating said wheels, a series of keys for each wheel, selector mechanism individual to each series of keys for controlling the degree of movement of the number wheels, means coöperating with the selector mechanism for locking the actuated key in its actuated position and for locking the unactuated keys of the respective series against actuation, a controlling key for controlling the operation of the number wheels, mechanism also actuated by the controlling key for locking the remaining unactuated keys against actuation, means for restoring the last said locking means and the controlling key, means for automatically restoring the selector mechanism, means for locking the latter when thus restored, and means operatively related to the said series of keys for releasing the respective selector mechanisms.

9. In a calculating machine, the combination of a totalizer comprising a plurality of number bearing wheels, mechanism for actuating the wheels, selector mechanisms individual to the wheels for controlling the degree of movement of the wheels, a series of keys individual to the selector mechanisms, means embodying a rock shaft for locking the selector mechanisms against operation, means on the shaft and individual to the keys of the respective series for rocking the respective shafts to release the selector mechanism, means coöperating with the selector mechanisms for locking the actuated key in its actuated position and the remaining keys of the respective series against actuation, a controlling key for controlling the actuation of the number wheels, and means operatively related to the controlling key for locking the unactuated shafts and the respective keys against actuation.

10. In a calculating machine, the combination of a totalizer comprising a plurality of number bearing wheels, mechanism for actuating the wheels, selector mechanisms individual to the wheels for controlling the degree of movement of the wheels, a series of keys individual to the selector mechanisms, means embodying a rock shaft for locking the selector mechanisms against operation, means on the shaft and individual to the keys of the respective series for rocking the respective shafts to release the selector mechanism, means coöperating with the selector mechanisms for locking the actuated key in its actuated position and the remaining keys of the respective series against actuation, a controlling key for controlling the actuation of the number wheels, and means actuated by the said controlling key for locking the unactuated shafts against actuation before the actuation of the first recited mechanism by the said controlling key.

11. In a calculating machine, the combination of a totalizer comprising a plurality of number bearing wheels, mechanism for actuating the wheels, selector mechanisms individual to the wheels for controlling the degree of movement of the wheels, a series of keys individual to the selector mechanisms, means embodying rock shafts individual to the selector mechanisms and the respective series of keys for locking the respective selector mechanisms against actuation, means coöoperating with the selector mechanisms for locking the actuated key in its actuated position and the remaining unactuated keys of the respective series against actuation, an arm on each of the shafts, a locking member common to the shafts and coöperating with the said arms for locking the shafts, and a controlling key for controlling said member and the first recited mechanism.

12. In a calculating machine the combination of a totalizer comprising a plurality of number bearing wheels, mechanism for actuating the wheels, selector mechanisms individual to the wheels for controlling the degree of movement of the wheels, a series of keys individual to the selector mechanisms, means embodying rock shafts individual to the selector mechanisms and the respective series of keys for locking the respective selector mechanisms against actuation, means coöperating with the selector mechanisms for locking the actuated key in its actuated position and the remaining unactuated keys of the respective series against actuation, an arm on each of the shafts, a locking member common to the shafts and coöperating with the said arms for locking the shafts, and a controlling key for the first recited mechanism and for actuating the said member in advance of the actuation of the said mechanism.

13. In a calculating machine, the combination of a totalizer comprising a plurality of number bearing wheels, mechanism for actuating the wheels, selector mechanisms individual to the wheels for controlling the degree of movement of the wheels, a series of keys individual to the selector mechanisms, means embodying rock shafts individual to the selector mechanisms and the respective series of keys for locking the respective selector mechanisms against actuation, means coöperating with the selector mechanisms for locking the actuated key in its actuated position and the remaining unactuated keys of the respective series against actuation, an arm on each of the shafts, a locking member common to the shafts and coöperating with the said arms for locking the shafts, a controlling key for controlling said member and the first recited mechanism, means for restoring the said member to release the shafts locked thereby.

14. In a calculating machine, the combination of a totalizer comprising a plurality of number bearing wheels, mechanism for actuating the wheels, selector mechanisms individual to the wheels for controlling the degree of movement of the wheels, a series of keys individual to the selector mechanisms, means embodying rock shafts individual to the selector mechanisms and the respective series of keys for locking the respective selector mechanisms against actuation, means coöperating with the selector mechanisms for locking the actuated key in its actuated position and the remaining unactuated keys of the respective series against actuation, an arm on each of the shafts, a locking member common to the shafts and coöperating with the said arms for locking the shafts, a controlling key for controlling said member and the first recited mechanism, means for restoring the said member to release the shafts locked thereby, and means for restoring the actuated shafts to lock the respective selector mechanism.

15. In a calculating machine, the combination of a totalizer comprising a plurality of number bearing wheels, operating mechanism for the wheels, power mechanism, a normally inactive coupling between the operating and power mechanisms, selector mechanisms individual to the number wheels for controlling the degree of rotation of the latter, a series of keys individual to the selector mechanisms, means coöperating with the selector mechanisms for locking the actuated key in its actuated position and the unactuated keys against actuation, mechanism for locking the remaining unactuated keys against actuation, a loose connection between the controlling key and the said coupling whereby the last recited locking mechanism will be actuated before the said coupling is rendered active, and means for locking the said controlling key in its actuated position.

16. In a calculating machine, the combination of a totalizer comprising a plurality of number bearing wheels, operating mechanism for the wheels, power mechanism, a normally inactive coupling between the operating and power mechanisms, selector mechanisms individual to the number wheels for controlling the degree of rotation of the latter, a series of keys individual to the selector mechanisms, means coöperating with the selector mechanisms for locking the actuated key in its actuated position and the unactuated keys against actuation, mechanism for locking the remaining unactuated keys against actuation, and a loose connection between the controlling key and the said coupling whereby the last recited locking mechanism will be actuated before the said coupling is rendered active, said coupling embodying mechanism for locking the controlling key against return.

17. The combination with a series of number bearing members, of an operating mechanism therefor, a common source of power, means for establishing a connection between said common source of power and said operating mechanism, a plurality of denominational series of keys for rendering said number bearing members active, a selective mechanism for each denominational series, arranged to retain the actuated key of each series in such position, and means operable from the common source of power independent of the connection between said source of power and said operating mechanism, for restoring said selective mechanisms to their passive positions thereby releasing said keys.

18. The combination with a series of number bearing members, of a common source of power, and intermittently operable mechanism for transmitting movement from said source of power to said number bearing members, keys for rendering any one or all of said number bearing members active, a locking mechanism operable by said keys for retaining all actuated keys in such positions, means for establishing a connection between the source of power and said intermittently operable mechanism, means operable from the common source of power for releasing said keys for the return thereof to their normal position independently of said intermittently operable mechanism and the connection between the same and the common source of power.

19. The combination of a common source of power with a plurality of number bearing members operable therefrom, keys for rendering said number bearing members active, a locking mechanism for retaining said keys in their actuated positions and a releasing mechanism operable from the common source of power for releasing said keys for the return thereof to their normal positions independently of the number bearing members.

20. The combination with a common source of power, of number bearing members operable therefrom, and intermediate mechanism interposed between said source of power and said number bearing members for the operation of the latter, keys, means operable from said keys for controlling the intermediate mechanism to impart a variable movement to said number bearing members, said means adapted to lock the keys in their actuated positions, means operable from the source of power independently of the intermediate mechanism for releasing the keys for the return thereof to their normal position to render the number bearing members inoperative.

21. The combination with a common source of power, of number bearing members, an intermediate mechanism interposed between said source of power and said number bearing member for the operation of the latter, a plurality of keys, means operable from said keys for controlling the intermediate mechanism, at the same time lock the actuated keys in such positions and lock the remaining keys from movement, and a releasing mechanism for permitting said keys to return to their normal or passive positions rendering all of the elements of the intermediate mechanism inactive.

22. The combination with a plurality of number bearing members, of an intermediate mechanism for operating said number bearing members, a plurality of denominational keys, a selective mechanism for determining the operation of the intermediate mechanism and the number bearing mechanism, under the control of the keys, whereby both the actuated and unactuated keys are locked from movement, and means for locking said selective mechanism during the actuation of the machine.

23. The combination with a plurality of number bearing members, of a plurality of keys, an intermediate mechanism normally inactive for operating said number bearing members, means controlled by said keys for controlling said intermediate mechanism at the same time locking the actuated keys in such positions and the remaining keys from movement, and means for restoring said elements to their normal positions and releasing said keys.

24. The combination with a plurality of number bearing members, of an operating mechanism for said members, selector mechanisms individual to the number bearing members for controlling the movement of the number bearing members and the operating mechanism therefor, a plurality of keys arranged in series, adapted to operate the selector mechanism and be locked by the latter in their actuated or passive positions, a common source of power for transmitting motion to said operating mechanism, an intermittent connection between said source of power and said operating mechanism, means common to all of the selector mechanisms aforesaid for returning the same to their normal positions thereby releasing the keys, said means being operable from the source of power independently of the connection between said source of power and said operating mechanism, and means for locking the selector mechanisms of the series of keys in which no key has been actuated.

25. The combination with a plurality of number bearing members, of independent operating means for each of said number bearing members, a common source of power for said operating means, a plurality of keys arranged in series, one series for each number bearing member, a selector mechanism for each series of keys adapted to establish a connection between the operating mechanism and the corresponding number bearing member, said selector mechanism adapted to lock the actuated key and the unactuated keys of the respective series from movement, means for rendering all of the operating mechanisms active, and means operable from the source of power for returning said selector mechanisms to their normal positions independently of the number bearing members' operating means.

26. The combination with a common source of power, of a plurality of number bearing members, individual operating mechanisms for said number bearing members, a connection between said individual operating mechanisms and said source of power whereby movement may be transmitted from the latter to the number bearing members, selector mechanisms, keys for operating said selector mechanism adapted to be locked in their active or inactive positions by said selector mechanisms, means for releasing said selector mechanisms and restoring said keys to their normal positions, said means being operable independently of the connection between the operating mechanism and said source of power and from the latter, and means for locking the connection aforesaid from movement during the operation of the releasing mechanism and vice versa.

27. In a calculating machine, the combination of a totalizer comprising a plurality of number bearing wheels, selector mechanisms individual to the wheels for controlling the degree of rotation of the wheels, a series of keys individual to each of the selector mechanisms, means coöperating with the selector mechanisms for locking the actuated keys in their actuated positions and for locking the remaining unactuated keys of the respective series against actuation, operating mechanism for the number wheels including a normally inactive coupling, a controlling key for the coupling, a rock shaft, means operatively related to the operating mechanism and the rock shaft for rocking the latter, a second rock shaft, means operatively related to both of the rock shafts for imparting motion from one to the other, and means operatively related to the second recited rock shaft for restoring the said selector mechanisms.

28. In a calculating machine, the combination of a totalizer comprising a plurality of number bearing wheels, selector mechanisms individual to the wheels for controlling the degree of rotation of the wheels, a series of keys individual to each of the selector mechanisms, means coöperating with the selector mechanisms for locking the actuated keys in their actuated positions and for locking the remaining unactuated keys of the respective series against actuation, operating mechanism for the number wheels including a normally inactive coupling, a controlling key for the coupling, a rock shaft, means operatively related to the operating mechanism and the rock shaft for rocking the latter, a second rock shaft, means operatively related to both of the rock shafts for imparting motion from one to the other, pivotally supported members individual to the selector mechanisms, and means on the second recited rock shaft adapted to engage the respective members to restore the selector mechanisms, 29. In a calculating machine, the combination of a totalizer comprising a plurality of number bearing wheels, selector mechanisms individual to the wheels for controlling the degree of rotation of the wheels, a series of keys individual to each of the selector mechanisms, means coöperating with the selector mechanisms for locking the actuated keys in their actuated positions and for locking the remaining unactuated keys of the respective series against actuation, operating mechanism for the number wheels including a normally inactive coupling, a controlling key for the coupling, a rock shaft, means operatively related to the operating mechanism and the rock shaft for rocking the latter, a second rock shaft, means operatively related to both of the rock shafts for imparting motion from one to the other, pivotally supported members individual to the selector mechanisms, arms on the second recited rock shaft normally out of engagement with the last said members and adapted to engage the respective members when the shaft is rocked to restore the selector mechanisms, and means tending normally to move the members in a direction toward the respective arms.

30. In a calculating machine, the combination of a totalizer comprising a plurality of number bearing wheels, selector mechanisms individual to the wheels, for controlling the degree of rotation thereof, keys individual to the selector mechanisms, operating mechanism for the wheels, power mechanism for imparting motion to the said operating mechanism and including a normally inactive coupling, a controlling key for the coupling, a rock shaft, means operatively related to the power mechanism for rocking said shaft, means operatively related to the rock shaft and the selector mechanisms for restoring the latter when the shaft is rocked, and an operative connection between the power mechanism and the said controlling key for restoring the latter.

31. In a calculating machine, the combination of a totalizer comprising a plurality of number bearing wheels, selector mechanisms individual to the wheels for controlling the degree of rotation thereof, keys individual to the selector mechanisms, operating mechanism for the wheels, power mechanism for imparting motion to the said operating mechanism and including a normally inactive coupling, a controlling key for the coupling, a rock shaft, means operatively related to the power mechanism for rocking said shaft, means operatively related to the rock shaft and the selector mechanisms for restoring the latter when the shaft is rocked, and an operative connection between the rock shaft and the controlling key for restoring the latter when the shaft is rocked.

32. In a calculating machine, the combination of a totalizer comprising a plurality of number bearing wheels, selector mechanisms individual to the wheels for controlling the degree of rotation thereof, keys individual to the selector mechanisms, operating mechanism for the wheels, power mechanism for imparting motion to the said operating mechanism and including a normally inactive coupling, a controlling key for the coupling, a rock shaft, means operatively related to the power mechanism for rocking said shaft, means operatively related to the rock shaft and the selector mechanisms for restoring the latter when the shaft is rocked, and an operative connection between the power mechanism and the said controlling key for restoring the latter, the last said connection embodying a pair of coöperating rock shafts and arms individual to the shafts adapted to engage each other.

33. In a calculating machine, the combination of a totalizer comprising a plurality of number bearing wheels, selector mechanisms individual to the wheels for controlling the degree of rotation thereof, keys individual to the selector mechanisms, operating mechanism for the wheels, power mechanism for imparting motion to the said operating mechanism and including a normally inactive coupling, a controlling key for the coupling, a rock shaft, means operatively related to the power mechanism for rocking said shaft, means operatively related to the rock shaft and the selector mechanisms for restoring the latter when the shaft is rocked, and an operative connection between the power mechanism and the said controlling key for restoring the latter, the last said connection embodying a pair of coöperating rock shafts, and arms individual to the shafts and adapted to engage each other, said arms being normally out of engagement whereby one of the rock shafts may be moved independently with respect to the other.

34. In a calculating machine, the combination of a totalizer comprising a plurality of number bearing wheels, selector mechanisms individual to the wheels for controlling the degree of rotation thereof, operating mechanism for the wheels, a running shaft, a normally inactive connection between the running shaft and the operating mechanism, a controlling key for the connection, and an operative connection between the running shaft and the selector mechanisms for restoring the latter after the operation of the number wheels, the last said connection embodying a pair of coöperating rock shafts and disconnected arms individual to the shafts and adapted to be brought into engagement for imparting motion from one of the rock shafts to the other.

35. In a calculating machine, the combination of a totalizer comprising a plurality of number bearing wheels, selector mechanisms individual to the wheels for controlling the degree of rotation thereof, operating mechanism for the wheels, a running shaft, a normally inactive connection between the running shaft and the operating mechanism, a controlling key for the connection, an operative connection between the running shaft and the selector mechanisms for restoring the latter after the operation of the number wheels, the last said connection embodying a pair of coöperating rock shafts, and disconnected arms individual to the shafts and adapted to be brought into engagement for imparting motion from one of the rock shafts to the other, and means for locking the controlling key in its actuated position when the said running shaft is idle.

36. In a calculating machine, the combination of a totalizer comprising a plurality of number bearing wheels, selector mechanisms individual to the wheels for controlling the degree of rotation thereof, operating mechanism for the wheels, a running shaft, a normally inactive connection between the running shaft and the operating mechanism, a controlling key for the connection, an operative connection between the running shaft and the selector mechanisms for restoring the latter after the operation of the number wheels, the last said connection embodying a pair of coöperating rock shafts and disconnected arms individual to the shafts and adapted to be brought into engagement for imparting motion from one of the rock shafts to the other, and means operatively related to the running shaft for restoring the selector mechanisms before the actuation of the number wheels.

37. In a calculating machine, the combination of a totalizer comprising a plurality of number bearing wheels, selector mechanisms individual to the wheels for controlling the degree of rotation thereof, operating mechanism for the wheels, a running shaft, a normally inactive connection between the running shaft and the operating mechanism, a controlling key for the connection, an operative connection between the running shaft and the selector mechanisms for restoring the latter after the operation of the number wheels, the last said connection embodying a pair of coöperating rock shafts and disconnected arms individual to the shafts and adapted to be brought into engagement for imparting motion from one of the rock shafts to the other, means operatively related to the running shaft for restoring the selector mechanisms before the action of the number wheels, and means for controlling the last said means at will.

38. In a calculating machine, the combination of a totalizer comprising a plurality of number bearing wheels, selector mechanisms individual to the wheels for controlling the degree of rotation thereof, operating mechanism for the wheels, a running shaft, a normally inactive connection between the running shaft and the operating mechanism, a controlling key for the connection, an operative connection between the running shaft and the selector mechanisms for restoring the latter after the operation of the number wheels, the last said connection embodying a pair of coöperating rock shafts and disconnected arms individual to the shafts and adapted to be brought into engagement for imparting motion from one of the rock shafts to the other, means also operatively related to the running shaft for restoring the selector mechanisms before the action of the number wheels, means for controlling the last said means at will, and means for locking the said controlling key when the last said controlling means is actuated.

39. In a calculating machine, the combination of a totalizer comprising a plurality of number bearing wheels, selector mechanisms individual to the wheels for controlling the degree of rotation thereof, operating mechanism for the wheels, a running shaft, a normally inactive connection between the running shaft and the operating mechanism, a controlling key for the connection, an operative connection between the running shaft and the selector mechanisms for restoring the latter after the operation of the number wheels, the last said connection embodying a pair of coöperating rock shafts and disconnected arms individual to the shafts and adapted to be brought into engagement for imparting motion from one of the rock shafts to the other, means also operatively related to the running shaft for restoring the selector mechanisms before the actuation of the number wheels, means for controlling the last said means at will, and means for locking the last recited controlling means against actuation when the said controlling key is actuated.

40. In a calculating machine, the combination of a totalizer comprising a plurality of number bearing wheels, selector mechanisms individual to the wheels for controlling the degree of rotation thereof, operating mechanism for the wheels, a running shaft, a normally inactive connection between the running shaft and the operating mechanism, a controlling key for the connection, an operative connection between the running shaft and the selector mechanisms for restoring the latter after the operation of the number wheels, the last said connection embodying a pair of coöperating rock shafts and disconnected arms individual to the shafts and adapted to be brought into engagement for imparting motion from one of the rock shafts to the other, means operatively related to the running shaft for restoring the selector mechanisms before the actuation of the number wheels, means for controlling the last said means at will, and means common to the said controlling key and the last recited controlling means and operable by both to lock one against actuation when the other is actuated.

41. In a calculating machine, the combination of a totalizer comprising a plurality of number bearing wheels, selector mechanisms individual to the wheels for controlling the degree of rotation thereof, operating mechanism for the wheels, a running shaft, a normally inactive connection between the running shaft and the operating mechanism, a controlling key for the connection, an operative connection between the running shaft and the selector mechanisms for restoring the latter after the operation of the number wheels, the last said connection embodying a pair of coöperating rock shafts and disconnected arms individual to the shafts and adapted to be brought into engagement for imparting motion from one of the rock shafts to the other, means operatively related to the running shaft for restoring the selector mechanisms before the actuation of the number wheels, means for controlling the last said means at will, means common to the said controlling key and the last recited controlling means and operable by both to lock one against actuation when the other is actuated, and means for rendering the locking means inoperative.

42. In a calculating machine, the combination of a totalizer comprising a plurality of number bearing wheels, operating shafts therefor, selector mechanisms for controlling the degree of rotation of the number bearing members, a power shaft, a normally inactive connection between the operating and power shafts, controlling key mechanism for said connection, means for restoring the selector mechanisms, a normally inactive connection between the last said means and the power shaft, controlling key mechanism for the last said connection, and means operatively related to the first said connection for also restoring the selector mechanism.

43. In a calculating machine, the combination of a totalizer comprising a plurality of number bearing wheels, operating shafts therefor, selector mechanisms for controlling the degree of rotation of the number bearing members, a power shaft, a normally inactive connection between the operating and power shafts, controlling key mechanism for said connection, means for restoring the selector mechanisms, a normally inactive connection between the last said means and the power shaft, controlling key mechanism for the last said connection, means operatively related to the first said connection for also restoring the selector mechanism, and means for locking either of said controlling mechanisms when the other is actuated.

44. In a calculating machine, the combination of a totalizer comprising a plurality of number bearing wheels, operating shafts therefor, selector mechanisms for controlling the degree of rotation of the number bearing members, a running power shaft, a normally inactive connection between the operating and power shafts, controlling key mechanism for said connection, means for restoring the selector mechanisms, a normally inactive connection between the last said means and the power shaft, controlling key mechanism for the last said connection, means operatively related to the first said connection for also restoring the selector mechanism, means controlled by the first recited controlling key mechanism for locking the second recited key controlling mechanism when the former is actuated, and means for locking the first recited controlling key mechanism in its actuated position when the running shaft is idle.

45. In a totalizer, the combination of movable number bearing members, each provided with two sets of figures, means for moving said members, a power shaft, a normally inactive connection between the last said means and the power shaft, a movable indicator for indicating the numbers of the respective sets, means for moving the indicator to indicate one of the series of numbers when the number member of the highest denomination crosses the zero point, means adapted to be set by said indicator to add a digit to the units number bearing member, and means adapted to automatically render the said connection active when the last recited means is set.

46. In a totalizer, the combination of movable number bearing members, each provided with two sets of figures, means for moving said members, a power shaft, a normally inactive connection between the last said means and the power shaft, a movable indicator for indicating the numbers of the respective sets, means operatively related to the number bearing member of the highest denomination for moving the indicator to indicate one of the series of numbers when the last said number bearing member crosses the zero point, means adapted to be set by said indicator to add a digit to the units number bearing member, and means adapted to automatically render the said connection active when the last recited means is set.

47. In a totalizer, the combination of movable number bearing members, each provided with two sets of figures, means for moving said members, a power shaft, a normally inactive connection between the last said means and the power shaft, a movable indicator for indicating the numbers of the respective sets, means for moving the indicator to indicate one of the series of numbers when the number member of the highest denomination crosses the zero point, means adapted to be set by said indicator to add a digit to the units number bearing member, means adapted to automatically render the said coupling active when the last recited means is set, and means for locking the indicator in its adjusted positions.

48. In a totalizer, the combination of movable number bearing members, each provided with two sets of figures, means for moving said members, a power shaft, a normally inactive connection between the last said means and the power shaft, a movable indicator for indicating the numbers of the respective sets, means for moving the indicator to indicate one of the series of numbers when the number member of the highest denomination crosses the zero point, means adapted to be set by said indicator to add a digit to the units number bearing member, means adapted to automatically render the said coupling active when the last recited means is set, and yielding means for locking the indicator in its adjusted positions.

49. In a calculating machine, the combination of a totalizer comprising a plurality of number bearing members, each provided with two sets of figures, normally inactive means individual to the members for operating said members, a power shaft, means operatively related to each of the members for rendering the operating means of the member of the next highest denomination active, a normally inactive coupling between the power shaft and the operating means of the number bearing members, a movable indicator, means for moving the indicator to indicate one of the series of numbers when the number bearing member of the highest order crosses the zero point, means operatively related to the indicator for rendering the operating means of the units number bearing member active when the indicator is shifted, and means also operatively related to the indicator for rendering the said coupling active.

50. In a calculating machine, the combination of a totalizer comprising a plurality of number bearing members, each provided with two sets of figures, normally inactive means individual to the members for operating said members, a power shaft, means operatively related to each of the members for rendering the operating means of the members of the next highest denomination active, a normally inactive coupling between the power shaft and the operating means of the number bearing members, a movable indicator, means for moving the indicator to indicate one of the series of numbers when the number bearing member of the highest order crosses the zero point, in either direction, means operatively related to the indicator for rendering the operating means of the units number bearing member active when the indicator is shifted, and means also operatively related to the indicator for rendering the said coupling active.

51. In a calculating machine, the combination of a totalizer comprising a plurality of number bearing members, each provided with two sets of figures, an indicator movable from one to the other sets, carrying mechanism for carrying from one member to the next adjacent member of a higher order, a power shaft, operating mechanism for the members, a normally inactive coupling between the operating mechanisms and the power shaft, key controlled mechanism for rendering the coupling active, means for moving the indicator, means adapted to be set by the movement of the indicator for adding a digit to the units number bearing member, and means also controlled by the movement of the indicator for rendering said coupling active.

52. In a calculating machine, the combination of a totalizer comprising a plurality of number bearing members, each provided with two sets of figures, an indicator movable from one to the other sets, carrying mechanism for carrying from one member to the next adjacent member of a higher order, a power shaft, operating mechanism for the members, a normally inactive coupling between the operating mechanisms and the power shaft, key controlled mechanism for rendering the coupling active, means for moving the indicator, means adapted to be set by the movement of the indicator in either direction for adding a digit to the units number bearing member, and means also controlled by the movement of the indicator for rendering said coupling active.

53. In a calculating machine, the combination of a totalizer comprising a plurality of number bearing members, each provided with two sets of figures, an indicator movable from one to the other sets, carrying mechanism for carrying from one member to the next adjacent member of a higher order, a power shaft, operating mechanism for the members, a normally inactive coupling between the operating mechanisms and the power shaft, key controlled mechanism for rendering the coupling active, means for moving the indicator, means adapted to be set by the movement of the indicator for adding a digit to the units number bearing member, and means also controlled by the movement of the indicator for rendering said coupling active and without actuating said key controlled mechanism.

54. In a calculating machine, the combination of a totalizer comprising a plurality of number bearing members, each provided with two sets of figures, an indicator movable from one to the other sets, carrying mechanism for carrying from one member to the next adjacent member of a higher order, a power shaft, operating mechanism for the members, a normally inactive coupling between the operating mechanisms and the power shaft, key controlled mechanism for rendering the coupling active, means for moving the indicator, means adapted to be set by the movement of the indicator for adding a digit to the units number bearing member, the last said means embodying a rock shaft, and means operatively related to the rock shaft for rendering the said coupling active.

55. In a calculating machine, the combination of a totalizer comprising a plurality of number bearing members, each provided with two sets of figures, an indicator movable from one to the other sets, carrying mechanism for carrying from one member to the next adjacent member of a higher order, a power shaft, operating mechanism for the members, a normally inactive coupling between the operating mechanisms and the power shaft, key controlled mechanism for rendering the coupling active, means for moving the indicator, means adapted to be set by the movement of the indicator for adding a digit to the units number bearing member, the last said means embodying a rock shaft and means operatively related to the rock shaft for rendering the said coupling active, and means for rendering the said coupling inactive.

56. In a calculating machine, the combination of a totalizer comprising a plurality of number bearing members, each provided with two sets of figures, an indicator movable from one to the other sets, carrying mechanism for carrying from one member to the next adjacent member of a higher order, a power shaft, operating mechanism for the members, a normally inactive coupling between the operating mechanisms, and the power shaft, key controlled mechanism for rendering the coupling active, means for moving the indicator, means adapted to be set by the movement of the indicator for adding a digit to the units number bearing member, the last said means embodying a rock shaft, a normally inactive connection between the power and rock shafts, and means for rendering the last recited coupling active, and means operatively related to the rock shaft to render the first recited coupling active.

57. In a calculating machine, the combination of a totalizer comprising a plurality of number bearing members, each provided with two sets of figures, an indicator movable from one to the other sets, carrying mechanism for carrying from one member to the next adjacent member of a higher order, operating mechanism for the members, a power shaft, a normally inactive coupling between the operating mechanism and the power shaft, key controlled mechanism for rendering said coupling active, means for moving the indicator, a rock shaft, mechanism controlled by the rock shaft for adding a digit to the units number bearing member, a normally inactive coupling between the rock and power shafts, means controlled by the movement of the indicator to render the last recited coupling active to rock the shaft, an arm on the shaft, and means operatively related to the first recited coupling and adapted to be engaged by the arm when the shaft is rocked to render the said coupling active.

58. In a calculating machine, the combination of a totalizer comprising a plurality of number bearing members, each provided with two sets of figures, an indicator movable from one to the other sets, carrying mechanism for carrying from one member to the next adjacent member of a higher order, operating mechanism for the members, a power shaft, a normally inactive coupling between the operating mechanism and the power shaft, key controlled mechanism for rendering said coupling active, an indicator, means for moving the indicator, a rock shaft, mechanism controlled by the rock shaft for adding a digit to the units number bearing member, a normally inactive coupling between the rock and power shafts, means controlled by the movement of the indicator to render the last recited coupling active to rock the shaft, an arm on the shaft, means operatively related to the first recited coupling and adapted to be engaged by the arm when the shaft is rocked to render the said coupling active, and means individual to each of the couplings for rendering them inactive.

59. In a calculating machine, the combination of a totalizer comprising a plurality of number bearing members, each provided with two sets of figures, an indicator movable from one to the other sets, carrying mechanism for carrying from one member to the next adjacent member of a higher order, operating mechanism for the members, a power shaft, a normally inactive coupling between the operating mechanism and the power shaft, key controlled mechanism for rendering said coupling active, means for moving the indicator, a rock shaft, mechanism controlled by the rock shaft for adding a digit to the units number bearing member, a normally inactive coupling between the rock and power shafts, means controlled by the movement of the indicator to render the last recited coupling active to rock the shaft, an arm on the shaft, means operatively related to the first recited coupling and adapted to be engaged by the arm when the shaft is rocked to render the said coupling active, and means for returning the rock shaft whereby the first recited coupling may be rendered active independently with respect to the rock shaft.

60. In a calculating machine, the combination of a totalizer comprising a plurality of number bearing members, each provided with two sets of figures, an indicator movable from one to the other of the sets, normally inactive operating mechanism for each of the members, means actuated by each of the members for controlling the operating mechanism of the number bearing member of the next highest order, a power shaft, means adapted to be set by the movement of the indicator to add a digit to the units member, means controlled by the said movement of the indicator for imparting motion from the power shaft to the said operating mechanisms, and means for rendering the said operating means of the number bearing members inactive.

61. In a calculating machine, the combination of a totalizer comprising a plurality of number bearing members each provided with two sets of figures, an indicator movable from one to the other of the sets, normally inactive operating mechanism for each of the members, means actuated by each of the members for controlling the operating mechanism of the number bearing member of the next highest order, a power shaft, means adapted to be set by the movement of the indicator to add a digit to the units member, means controlled by the said movement of the indicator for imparting motion from the power shaft to the said operating mechanisms, and means operatively related to the operating mechanism of the number bearing member of the highest order for rendering the operating mechanisms of all of said members inactive.

62. In a calculating machine, the combination of a totalizer comprising a plurality of number bearing members, each provided with two sets of figures, an indicator movable from one to the other of the sets, normally inactive operating mechanism for each of the members, means actuated by each of the members for controlling the operating mechanism of the number bearing member of the next highest order, a power shaft, means adapted to be set by the movement of the indicator to add a digit to the units member, means controlled by the said movement of the indicator for imparting motion from the power shaft to the said operating mechanisms, means for rendering the last recited means inactive, and means for rendering the said operating means of the number bearing members inactive.

63. In a calculating machine, the combination of a totalizer comprising a plurality of number bearing members, each having two sets of figures thereon, operating mechanisms therefor, means operatively related to each of the members for controlling the operating mechanism of the member of the next highest order, a power shaft, a normally inactive connection between the power shaft and the operating mechanisms, key actuated mechanism for controlling the connection, an indicator movable from one to the other of the sets, means for thus moving the indicator when the number bearing member crosses the zero point in either direction, means for controlling the direction of movement of the number bearing members, and means controlled by the movement of the indicator for automatically adding a digit to the units number bearing member.

64. In a calculating machine, the combination of a totalizer comprising a plurality of number bearing members, each having two sets of figures thereon, operating mechanisms therefor, means operatively related to each of the members for controlling the operating mechanism of the member of the next highest order, a power shaft, a normally inactive connection between the power shaft and the operating mechanisms, key actuated mechanism for controlling the connection, an indicator movable from one to the other of the sets, means for thus moving the indicator when the number bearing member crosses the zero point in either direction, means for controlling the direction of movement of the number bearing members, means controlled by the movement of the indicator for automatically adding a digit to the units number bearing member, and yielding means for locking the indicator in each of its adjusted positions.

65. In a calculating machine, the combination of a totalizer comprising a plurality of number bearing members, each having two sets of figures thereon, operating mechanisms therefor, means operatively related to each of the members for controlling the operating mechanism of the member of the next highest order, a power shaft, a normally inactive connection between the power shaft and the operating mechanisms, key actuated mechanism for controlling the connection, an indicator movable from one to the other of the sets, means for thus moving the indicator when the number bearing member crosses the zero point in either direction, means for controlling the direction of movement of the number bearing members, means adapted to be set by the movement of the indicator to add a digit to the units number bearing member, and means other than the said coupling and controlled by the movement of the indicator for operatively connecting the power shaft with the units number bearing member.

66. In a calculating machine, the combination of a totalizer comprising a plurality of number bearing members, each having two sets of figures thereon, operating mechanisms therefor, means operatively related to each of the members for controlling the operating mechanism of the member of the next highest order, a power shaft, a normally inactive connection between the power shaft and the operating mechanisms, key actuated mechanism for controlling the connection, an indicator movable from one to the other of the sets, means for thus moving the indicator when the number bearing member crosses the zero point in either direction, means for controlling the direction of movement of the number bearing members, means adapted to be set by the movement of the indicator to add a digit to the units number bearing member, means other than the said coupling and controlled by the movement of the indicator for operatively connecting the power shaft with the units number bearing member, and means for automatically rendering the last said means inactive.

67. In a calculating machine, the combination of a totalizer comprising a plurality of number bearing members, operating mechanisms therefor including a pair of gears for each member movable into and out of mesh, an operating shaft for said gears, means for holding the respective pairs of gears out of mesh, means operatively related to the number bearing members for operating the said holding means of the number bearing member of the next higher order, means for moving the gears into mesh with the respective coöperating gears when released, a power shaft, a normally inactive coupling between the power and operating shafts, and key actuated mechanism for rendering said coupling active.

68. In a calculating machine, the combination of a totalizer comprising a plurality of number bearing members, operating mechanisms therefor including a pair of gears for each member movable into and out of mesh, an operating shaft for said gears, means for holding the respective pairs of gears out of mesh, means operatively related to the number bearing members for operating the said holding means of the number bearing member of the next higher order, means for moving the gears into mesh with the respective coöperating gears when released, a power shaft, a normally inactive coupling between the power and operating shafts, key actuated mechanism for rendering said coupling active, and means for rendering the said coupling inactive.

69. In a calculating machine, the combination of a totalizer comprising a plurality of number bearing members, operating mechanisms therefor including a pair of gears for each member movable into and out of mesh, an operating shaft for said gears, means for holding the respective pairs of gears out of mesh, means operatively related to the number bearing members for operating the said holding means of the number bearing member of the next higher order, means for moving the gears into mesh with the respective coöperating gears when released, a power shaft, a normally inactive coupling between the power and operating shafts, key actuated mechanism for rendering said coupling active, and means for moving the said coöperating gears out of mesh.

70. In a calculating machine, the combination of a totalizer comprising a plurality of number bearing members, operating mechanisms therefor including a pair of gears for each member movable into and out of mesh, an operating shaft for said gears, means for holding the respective pairs of gears out of mesh, means operatively related to the number bearing members for operating the said holding means of the number bearing member of the next higher order, means for moving the gears into mesh with the respective coöperating gears when released, a power shaft, a normally inactive coupling between the power and operating shafts, key actuated mechanism for rendering said coupling active, and positive means for moving the coöperating gears out of mesh.

71. In a calculating machine, the combination of a totalizer comprising a plurality of number bearing members, operating mechanisms therefor including a pair of gears for each member movable into and out of mesh, an operating shaft for said gears, means for holding the respective pairs of gears out of mesh, means operatively related to the number bearing members for operating the said holding means of the number bearing member of the next higher order, means for moving the gears into mesh with the respective coöperating gears when released, a power shaft, a normally inactive coupling between the power and operating shafts, key actuated mechanism for rendering said coupling active, and means operatively related to the number bearing member of the highest order for moving the coöperating gears out of mesh.

72. In a calculating machine, the combination of a totalizer comprising a plurality of number bearing members, operating mechanisms therefor, including a pair of gears for each member movable into and out of mesh, an operating shaft for said gears, means for holding the respective pairs of gears out of mesh, means operatively related to the number bearing members for operating the said holding means of the number bearing member of the next higher order, means for moving the gears into mesh with the respective coöperating gears when released, a power shaft, a normally inactive coupling between the power and operating shafts, key actuated mechanism for rendering said coupling active, means for moving the coöperating gears out of mesh, said means embodying a rock shaft and arms on the shaft adapted to engage and move the respective gears out of mesh, and means for rocking the shaft.

73. In a calculating machine, the combination of a totalizer comprising a plurality of number bearings members, operating mechanisms therefor including a pair of gears for each member movable into and out of mesh, an operating shaft for said gears, means for holding the respective pairs of gears out of mesh, means operatively related to the number bearing members for operating the said holding means of the number bearing member of the next higher order, means for moving the gears into mesh with the respective coöperating gears when released, a power shaft, a normally inactive coupling between the power and operating shafts, key actuated mechanism for rendering said coupling active, means for moving the coöperating gears out of mesh, said means embodying a rock shaft and arms on the shaft adapted to engage and move the respective gears out of mesh, and means operatively related to the number bearing member of the highest order for rocking the shaft.

74. In a calculating machine, the combination of a totalizer comprising a plurality of number bearing members, operating mechanisms therefor including a pair of gears for each member movable into and out of mesh, an operating shaft for said gears, means for holding the respective pairs of gears out of mesh, means operatively related to the number bearing members for operating the said holding means of the number bearing member of the next higher order, means for moving the gears into mesh with the respective coöperating gears when released, a power shaft, a normally inactive coupling between the power and operating shafts, key actuated mechanism for rendering said coupling active, means for moving the coöperating gears out of mesh, said means embodying a rock shaft and arms on the shaft adapted to engage and move the respective gears out of mesh, a cam operatively related to the number bearing member of the highest order, and an additional arm on the rock shaft adapted to be engaged by the cam to rock the shaft.

75. In a calculating machine, the combination of a totalizer comprising a plurality of number bearing members, operating mechanism therefor, said members being provided with two sets of figures, an indicator shiftable from one to the other of said sets, a power shaft, key controlled mechanism for connecting the shaft with the operating mechanism, a rock shaft, means controlled by the rock shaft for controlling the operating mechanism of the units bearing member, a normally inactive connection between the rock and power shafts including a cam on the power shaft and an arm on the rock shaft adapted to be engaged by the cam to rock the shaft to render the units bearing members operating mechanism active, and means controlled by the movement of the indicator to render the said connection and the cam active.

76. In a calculating machine, the combination of a totalizer comprising a plurality of number bearing members, operating mechanism therefor, said members being provided with two sets of figures, an indicator shiftable from one to the other of said sets, a power shaft, key controlled mechanism for connecting the shaft with the operating mechanism, a rock shaft, means controlled by the rock shaft for controlling the operating mechanism of the units bearing member, a normally inactive connection between the rock and power shafts including a cam on the power shaft and an arm on the rock shaft adapted to be engaged by the cam to rock the shaft to render the units bearing members operating mechanism active, means controlled by the movement of the indicator to render the said connection and the cam active, and means for rendering the said connection and the cam inactive.

77. In a calculating machine, the combination of a series of rotatable number bearing members, means for operating said members, shafts for imparting motion to said operating means, power mechanism, means for imparting motion from said power mechanism to said shafts including a normally inactive coupling, key actuated mechanism for rendering said coupling active, positive means for returning the last recited mechanism, means for releasing said coupling when the shafts reach a predetermined point in their rotation, and means for causing the shafts to pass said point one or more times at will without actuating the returning and releasing mechanisms.

78. In a calculating machine, the combination of a series of rotatable number bearing members, means for operating said members, shafts for imparting motion to said operating means, power mechanism, means for imparting motion from said power mechanism to said shafts including a normally inactive coupling, key actuated mechanism for rendering said coupling active, positive means for returning the last recited mechanism, means for releasing said coupling when the shafts reach a predetermined point in their rotation, and means for rendering inactive the said returning means of the key actuated mechanism to permit the shafts to pass said point one or more times at will.

79. In a calculating machine, the combination of a series of rotatable number bearing members, means for operating said members, shafts for imparting motion to said operating means, power mechanism, means for imparting motion from said power mechanism to said shafts including a normally inactive coupling, key actuated mechanism for rendering said coupling active, positive means for returning the last recited mechanism, means for releasing said coupling when the shafts reach a predetermined point in their rotation, means for causing the shafts to pass said point one or more times at will without actuating the returning and releasing mechanisms.

80. In a calculating machine, the combination of a series of rotating number bearing members, means for operating said members, shafts for imparting motion to said operating means, power mechanism, means for imparting motion from said power mechanism to said shafts including a normally inactive coupling, key actuated mechanism for rendering said coupling active, positive means for returning the last recited mechanism, means for releasing said coupling when the shafts reach a predetermined point in their rotation, means for rendering inactive the said returning means of the key actuated mechanism to permit the shafts to pass said point one or more times at will, and means for controlling the direction of rotation of the number bearing members at will.

81. In a calculating machine, the combination of a totalizer comprising a plurality of number bearing members, operating mechanism for each of the members, selector mechanisms individual to the members for controlling the degree of rotation of the members, keys for setting the selector mechanisms, means for imparting motion to the number bearing members, means for returning the selector mechanisms and for rendering the motion imparting means inactive when the latter reach predetermined points in their movement, and means for maintaining said motion imparting means active to cause to the latter to pass said points one or more times at will without rendering the selector mechanism returning means active.

82. In a calculating machine, the combination of a totalizer comprising a plurality of number bearing members, operating mechanism therefor, selector mechanisms for controlling the degree of rotation of the members, keys for setting the selector mechanisms, a power shaft, means for connecting the power shaft with the operating mechanism, means for restoring the selector mechanisms when the operating mechanism reaches a predetermined point in its movement, the last said means including a rock shaft, an arm on the shaft and a cam operatively related to the operating mechanism adapted to engage the arm to rock the shaft, and means for rendering the cam and the arm inactive with relation to each other for causing the operating mechanism to pass said point one or more times at will and without restoring the selector mechanisms.

83. In a calculating machine, the combination of a totalizer comprising a plurality of number bearing members, operating mechanism therefor, selector mechanisms for controlling the degree of rotation of the members, keys for setting the selector mechanisms, a power shaft, means for connecting the power shaft with the operating mechanism, means for restoring the selector mechanisms when the operating mechanism reaches a predetermined point in its movement, the last said means including a rock shaft, an arm on the shaft, a cam operatively related to the operating mechanism adapted to engage the arm to rock the shaft, and means for laterally displacing said cam and arm one with relation to the other for causing the operating mechanism to pass said point one or more times at will and without restoring the selector mechanisms.

84. In a calculating machine, the combination of a totalizer comprising a plurality of number bearing members, operating mechanism therefor, selector mechanisms for controlling the degree of rotation of the members, said members each being provided with two sets of numbers, an indicator shiftable from one set to the other, means for thus shifting the indicator when the number bearing member of the highest order crosses the zero point, a power shaft, mechanism actuated by the movement of the indicator for connecting the power shaft and operating mechanisms, additional means for connecting the power shaft with the operating means, means for restoring the selector mechanisms, means for rendering the last said means inactive when the operating mechanism reaches a predetermined point in its movement, and means for causing the operating mechanism to pass said point one or more times without restoring the selector mechanisms.

85. In a calculating machine, the combination of a totalizer comprising a plurality of number bearing members, operating mechanism therefor, selector mechanisms for controlling the degree of rotation of the members, said members each being provided with two sets of numbers, an indicator shiftable from one set to the other, means for thus shifting the indicator, when the number bearing member of the highest order crosses the zero point, a power shaft, mechanism actuated by the movement of the indicator for connecting the power shaft and operating mechanisms, additional means for connecting the power shaft with the operating means, means for restoring the selector mechanisms, means for rendering the last said means inactive when the operating mechanism reaches a predetermined point in its movement, means for causing the operating mechanism to pass said point one or more times without restoring the selector mechanisms, and means for rendering the last recited mechanism inactive.

86. In a calculating machine, the combination of a totalizer comprising a plurality of number bearing members, operating mechanism therefor, selector mechanisms for controlling the degree of rotation of the members, said members each being provided with two sets of numbers, an indicator shiftable from one set to the other, means for thus shifting the indicator when the number bearing member of the highest order crosses the zero point, a power shaft, mechanism actuated by the movement of the indicator for connecting the power shaft and operating mechanisms, additional means for connecting the power shaft with the operating means, means for restoring the selector mechanisms, means for rendering the last said means inactive when the operating mechanism reaches a predetermined point in its movement, means for causing the operating mechanism to pass said point one or more times without restoring the selector mechanisms, and means operatively related to the last recited means for rendering the third recited mechanism inactive.

87. In a calculating machine, the combination of a totalizer comprising a plurality of number bearing wheels, each being provided with two sets of figures, operating mechanism therefor, key actuated mechanism for controlling the degree of rotation of the members, a power shaft, a normally inactive connection between the power shaft and the operating mechanism, means for rendering said connection active at will, means for restoring the key actuated mechanism when the operating mechanism passes a predetermined point, means for causing the operating mechanism to pass said point one or more times without restoring said key actuated mechanism, an indicator movable from one to the other sets of figures, means for thus moving the indicator, means controlled by the movement of the indicator for rendering said connection active, and means for rendering the last said means active when the third recited means is actuated.

88. In a calculating machine, the combination of a totalizer comprising a plurality of number bearing wheels, each being provided with two sets of figures, operating mechanism therefor, key actuated mechanism for controlling the degree of rotation of the members, a power shaft, a normally inactive connection between the power shaft and the operating mechanism, means for rendering said connection active at will, means for restoring the key actuated mechanism when the operating mechanism passes a predetermined point, means for causing the operating mechanism to pass said point one or more times without restoring said key actuated mechanism, an indicator movable from one to the other sets of figures, means for thus moving the indicator, means controlled by the movement of the indicator for rendering said connection active, and means operatively related to the third recited means and adapted to be rendered inactive when the latter is rendered active.

89. In a calculating machine, the combination of a totalizer comprising a plurality of number bearing wheels, each provided with two sets of numbers, an indicator, means for moving the indicator from one to the other set, operating mechanism for the wheels, selector mechanisms for controlling the degree of movement of the wheels, a rock shaft for restoring the selector mechanisms, a pair of cams for rocking the shaft, means actuated by the movement of the indicator for rendering one of said cams active to rock the shaft, and key actuated mechanism for controlling the other of the cams to rock the shaft when the operating mechanism passes a predetermined point in its movement.

90. In a calculating machine, the combination of a totalizer comprising a plurality of number bearing wheels, each provided with two sets of numbers, an indicator, means for moving the indicator from one to the other set, operating mechanism for the wheels, selector mechanisms for controlling the degree of movement of the wheels, a rock shaft for restoring the selector mechanisms, a pair of cams for rocking the shaft, means actuated by the movement of the indicator for rendering one of said cams active to rock the shaft, key actuated mechanism for controlling the other of the cams to rock the shaft when the operating mechanism passes a predetermined point in its movement, and means for causing the operating mechanism to pass said point one or more times at will without rocking the said shaft.

91. In a calculating machine, the combination of a totalizer comprising a plurality of number bearing wheels, each provided with two sets of numbers, an indicator, means for moving the indicator from one to the other set, operating mechanism for the wheels, selector mechanisms for controlling the degree of movement of the wheels, a rock shaft for restoring the selector mechanisms, a pair of cams for rocking the shaft, means actuated by the movement of the indicator for rendering one of said cams active to rock the shaft, key actuated mechanism for controlling the other of the cams to rock the shaft when the operating mechanism passes a predetermined point in its movement, means for causing the operating mechanism to pass said point one or more times at will without rocking the said shaft, and means for controlling the direction of movement of the number wheels.

92. In a calculating machine, the combination of a totalizer comprising a plurality of number bearing wheels, each provided with two sets of numbers, an indicator, means for moving the indicator from one to the other set, operating mechanism for the wheels, selector mechanisms for controlling the degree of movement of the wheels, a rock shaft for restoring the selector mechanisms, a pair of cams, means on the shaft and common to the cams for rocking the shaft, means actuated by the movement of the indicator for rendering one of said cams active to rock the shaft, key actuated mechanism for controlling the other of the cams to rock the shaft when the operating mechanism passes a predetermined point in its movement, and means for displacing the last recited cam and the said coöperating means on the rock shaft with respect to each other to cause the operating mechanism to pass said point one or more times without rocking the shaft.

93. In a calculating machine, the combination of a totalizer comprising a plurality of number bearing wheels, each provided with two sets of numbers, an indicator, means for moving the indicator from one to the other set, operating mechanism for the wheels, selector mechanisms for controlling the degree of movement of the wheels, a rock shaft for restoring the selector mechanisms, a pair of cams, means on the shaft and common to the cams for rocking the shaft, means actuated by the movement of the indicator for rendering one of said cams active to rock the shaft, key actuated mechanism for controlling the other of the cams to rock the shaft when the operating mechanism passes a predetermined point in its movement, means for displacing the last recited cam and the said coöperating means on the rock shaft with respect to each other to cause the operating mechanism to pass said point one or more times without rocking the shaft, and means controlled by such shifting movement for rendering the controlling mechanism of the first said cam inactive..

94. In a calculating machine, the combination of a totalizer comprising a plurality of number bearing wheels, each provided with two sets of numbers, an indicator, means for moving the indicator from one to the other set, operating mechanism for the wheels, selector mechanisms for controlling the degree of movement of the wheels, a rock shaft for restoring the selector mechanisms, a pair of cams, means on the shaft and common to the cams for rocking the shaft, means actuated by the movement of the indicator for rendering one of said cams active to rock the shaft, key actuated mechanism for controlling the other of the cams to rock the shaft when the operating mechanism passes a predetermined point in its movement. means for displacing the last recited cam and the coöperating means on the rock shaft with respect to each other to cause the operating mechanism to pass said point one or more times without rocking the shaft, means controlled by such shifting motion for rendering the controlling mechanism of the first said cam inactive, and means for controlling the direction of movement of the number bearing members at will.

In testimony whereof I have signed my name to this specification, in the presence of two subscribing witnesses, on this 1st day of September A. D. 1910.

SAMUEL E. CARLIN.

Witnesses:
J. H. JOCHUM, Jr.,
C. H. SEEM.

Copies of this patent may be obtained for five cents each, by addressing the "Commissioner of Patents, Washington, D. C."

DISCLAIMER.

1,208,287.—Whereas, on October 29, 1925, there was filed in this case a disclaimer to claims 5, 6, 7, 8, 21, and 23, but in the notice of this disclaimer as published in the OFFICIAL GAZETTE of November 17, 1925, the numbers of the claims disclaimed were given as 40, 72, and 73, now therefore this corrective notice of disclaimer is published.

1,208,287.—*Samuel E. Carlin*, Chicago, Ill. CALCULATING MACHINE. Patent dated December 12, 1916. Disclaimer filed October 29, 1925, by the assignee by mesne assignments, *John T. Underwood*.

Hereby enters this disclaimer to claims numbered 5, 6, 7, 8, 21, and 23, the right to said claims having been established by William S. Gubelmann in interference proceeding No. 43,578.

[*Official Gazette July 17, 1928.*]